(12) United States Patent
Johns et al.

(10) Patent No.: US 9,916,564 B1
(45) Date of Patent: Mar. 13, 2018

(54) COMPUTER-BASED SYSTEMS AND METHODS FOR COLLABORATIVE TRAVEL PLANNING

(76) Inventors: Robert A. Johns, Reading (GB); Beckie N. Watson, Centennial, CO (US); Annette L. Lewis, Aurora, CO (US); Simon J. Pearson, Swindon (GB)

( * ) Notice: Subject to any disclaimer, the term of this patent is extended or adjusted under 35 U.S.C. 154(b) by 721 days.

(21) Appl. No.: 12/650,227

(22) Filed: Dec. 30, 2009

Related U.S. Application Data

(60) Provisional application No. 61/147,574, filed on Jan. 27, 2009.

(51) Int. Cl.
  *G08G 1/01* (2006.01)
  *G01C 21/34* (2006.01)
  *G06Q 10/10* (2012.01)

(52) U.S. Cl.
  CPC .................................. *G06Q 10/10* (2013.01)

(58) Field of Classification Search
  CPC ..................................................... G06Q 10/10
  USPC ......... 701/22; 705/5, 6, 7.11, 7.12; 715/771; 345/581
  See application file for complete search history.

(56) References Cited

U.S. PATENT DOCUMENTS

| | | | |
|---|---|---|---|
| 2001/0053989 A1 | 12/2001 | Keller et al. | |
| 2002/0073158 A1* | 6/2002 | Dalal et al. | 709/206 |
| 2005/0288973 A1 | 12/2005 | Taylor et al. | |
| 2006/0106654 A1 | 5/2006 | Lettovsky et al. | |
| 2006/0277079 A1 | 12/2006 | Gilligan et al. | |
| 2007/0177584 A1 | 8/2007 | Kubler et al. | |
| 2007/0185744 A1 | 8/2007 | Robertson | |
| 2008/0091445 A1 | 4/2008 | Mihic | |
| 2009/0216633 A1 | 8/2009 | Whitsett et al. | |
| 2009/0248457 A1* | 10/2009 | Munter et al. | 705/5 |
| 2009/0265197 A1* | 10/2009 | Chan | 705/7 |

FOREIGN PATENT DOCUMENTS

WO    WO 02/05189 A1    1/2002

OTHER PUBLICATIONS

Greenacre et al, Multiple Correspondence Analysis and Related Methods, 2006, Chapman & Hall, p. 3-40 (Year: 2006).*

* cited by examiner

*Primary Examiner* — Akiba K Allen
(74) *Attorney, Agent, or Firm* — K&L Gates LLP

(57) ABSTRACT

Computer-based systems and methods for providing real-time collaborative travel planning among a group of travelers. The systems and methods may use an Internet website that provides travelers with real-time visibility into both planned and/or booked travel itineraries of the traveling companions for a particular journey. When a traveler books or selects part of the traveler's itinerary, notifications of the booking or selection may be sent to the other travelers in the group. Various embodiments of the present invention provide for real-time interactive discussions by the traveling companions about the journey. Throughout the life of the journey, each traveler may collaborate with his or her traveling companions to plan the most efficient journey utilizing real-time visibility of each traveler's itinerary.

20 Claims, 19 Drawing Sheets

Jeff

| Type | Details | Price | Add to Journey |
|---|---|---|---|
| 🏨 | Inn Select Denver Airport | USD $1200 | 🧳+ |
| 🚗 ✓ | Economy | USD $200 | 🧳+ |
| | | 🧳+ Add All | |

FIG. 11

| Type | Details | Price | Add to Journey |
|---|---|---|---|
| ✈ ✓ | 827<br>YYZ 12/01/08 6:40 AM<br>DEN 12/01/08 6:40 A.M. | USD $900 | 🧳➕ — 1110 |
| 🏢 ✓ | Inn Select<br>Denver Airport | USD $1200 | 🧳➕ — 1110 |
| 🚗 ✓ | Economy | USD $200 | 🧳➕ — 1110 |
| 📍 i | Point of interest 1 | $300 | 🧳➕ — 1110 |
| | Point of interest 2 | $450 | 🧳➕ — 1110 |
| | Point of interest 3 | $200 | 🧳➕ — 1110 |
| | | 🧳➕ Add All | 1112 |

COMPUTER-BASED SYSTEMS AND METHODS FOR COLLABORATIVE TRAVEL PLANNING

PRIORITY CLAIM

The present application claims priority to U.S. provisional application Ser. No. 61/147,574, entitled "Computer-based systems and methods for collaborative travel planning," filed Jan. 27, 2009, which is hereby incorporated by reference in its entirety.

BACKGROUND

Currently, when a group of people travel separately to a common location for a common event, coordinating the travel plans of the group of travelers can be time-consuming, irritating, imprecise, and inefficient. Many times, the members of the traveling groups have to exchange numerous communications, such as emails and phone calls, in order to coordinate their travel plans, such as arrival times, lodging accommodations, etc. The process of making and receiving all of these communications can be time-consuming and irritating. For example, if the plans of one traveler changes, that traveler has to notify the other travelers to apprise them of the change. In addition, to reach group consensus on issues requiring group input, such as, for example, the hotel at which to stay, can require a great number of time-consuming communications. The process can also be imprecise, for example, because some travelers may not bother to keep their fellow travelers up-to-date on their travel plans. Thus, it is often up to the vigilance of the individual travelers to keep their co-travelers abreast of their plans. Additionally, the process can be inefficient in a sense because often the travelers will merely send their finalized itineraries to their fellow travelers so that other travelers in the group who have not yet booked their travel plans can book their plans in view of the itineraries. This procedure can be inefficient because oftentimes the travelers who book their plans first drive the plans of the others, which process may obscure other options that are more efficient, convenient, and economical for other travelers.

SUMMARY

In one general aspect, the present invention is directed to computer-based systems and methods for providing real-time collaborative travel planning among a group of travelers. In one embodiment, the systems and methods of the present invention use an Internet website that provides travelers with real-time visibility into both planned and/or booked travel itineraries of the traveling companions for a particular journey. For example, with various embodiments of the present invention, if several people (e.g., "traveling companions") desire to travel to a particular destination for a particular event, held at a particular date and time, the travel companions (and/or their assistants or travel planners) can view at the website available travel options, as well as both planned (i.e., unbooked) and/or booked travel itineraries of the members in their travel group simultaneously. When a traveler books or selects part of the traveler's itinerary, notifications of the booking or selection may be sent to the other travelers in the group. In addition, various embodiments of the present invention provide for real-time interactive discussions by the traveling companions (or their assistants, etc.) about the journey. In such embodiments, throughout the life of the journey, each traveler may collaborate with his or her traveling companions to plan the most efficient journey utilizing real-time visibility of each traveler's itinerary.

These and other benefits of the present invention will be apparent from the description below.

FIGURES

Various embodiments of the present invention are described herein by way of example in connection with the following figures, wherein:

FIG. 1 is a diagram of a computer system according to various embodiments of the present invention;

FIGS. 2*a-b* are diagrams of processes according to various embodiments of the present invention;

FIGS. 3*a-c* are diagrams of processes according to various embodiments of the present invention;

FIG. 4-13 are diagrams of a user interface according to various embodiments of the present invention;

DESCRIPTION

The example embodiments presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

Figure 1:
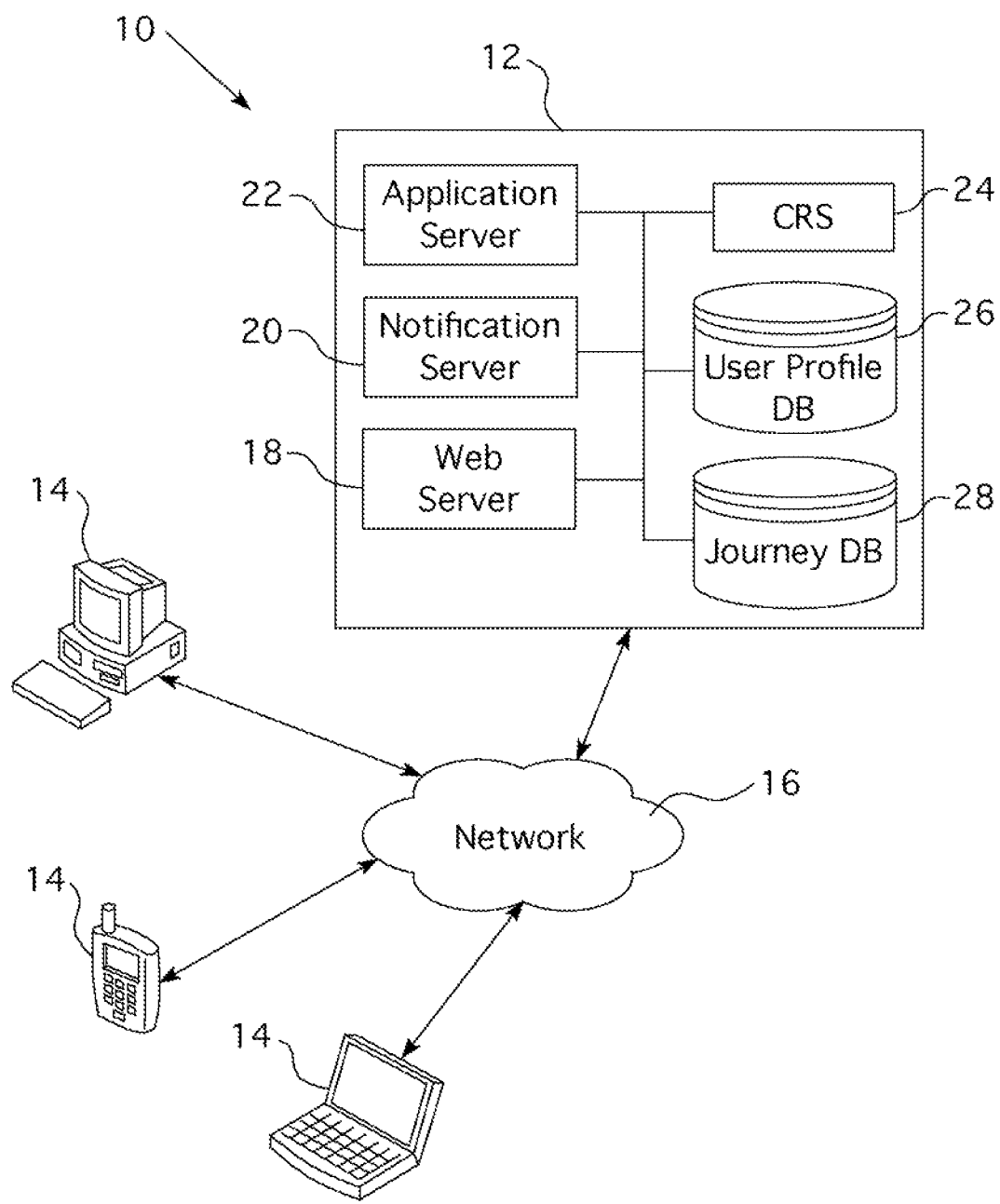

FIG. 1 is a diagram of a computer-based system 10 for providing real-time collaborative travel planning according to various embodiments of the present invention. The system 10 may comprise, as shown in FIG. 1, a computerized operations center 12 in communication with end-users 14 via an electronic communications network 16. The communications network 16 may comprise a number of computer and/or data networks, including the Internet, LANs, WANs, GPRS networks, etc., and may comprise wired and/or wireless communication links. The end-users 14 may communicate with the operations center 12 and each other via the network 16 using any type of client device suitable for communication over the network 16, including personal computers, laptop computers, smartphones, etc.

As shown in FIG. 1, the operations center 12 may comprise a number of computer servers and databases. For example, the operations center 12 may comprise one or more web servers 18, notification servers 20, and application servers 22. For convenience, only one web server 18, one notification server 20, and one application server 22 are shown in FIG. 1, although it should be recognized that the invention is not so limited. The web server 18 may provide a graphical web user interface through which users of the system, e.g., the end-users 14, may interact with the operations center 12. The web server 18 may accept requests, such as HTTP requests, from clients (such as web browsers on the client devices of the end-users 14), and serve the clients responses, such as HTTP responses, along with optional data content, such as web pages (e.g., HTML documents) and linked objects (such as images, etc.).

The application server 22 may provide a user interface for end-users 14 who do not communicate with the operations center 12 using a web browser. Such users may have special software installed on their end-user devices that allows them to communicate with the application server 22 via the network 16. Such software may be downloaded, for example, from the operations center 12 over the network to such end-user devices. The software may also be installed on such end-user devices by other means known in the art, such as CD-ROM, etc.

The user interface provided by the web-server 18 or the application server 22, as the case may be, as described further below, may permit end-users 14 to communicate with each other in real-time using Asynchronous JavaScript and XML (AJAX) web development techniques, for example. In other embodiments, the operations center 12 may provide, in addition or in the alternative, other mechanisms for real-time communication, such as instant messaging. For embodiments that provide instant messaging, the operations center 12 may comprise an instant messaging server (nor shown) for handling the instant messaging communications between the end-users 14.

The notification server 20 may cause notifications, such as emails, phone calls, or other types of communications, to be sent to the end-users 14 via the network 16 and to track/store the notifications. More details regarding the notification server 20 are provided below.

The servers 18, 20, 22 may comprise processors (e.g., CPUs), memory units (e.g., RAM, ROM), non-volatile storage systems (e.g., hard disk drive systems), etc. The servers 18, 20, 22 may utilize operating systems, such as Solaris, Linux, or Windows Server operating systems, for example.

In one embodiment, the operations center 12 also may comprise one or more computerized reservation systems (CRS) 24 that store travel data and that communicate electronically via a communications networks with providers of travel services (e.g., carriers, hotels, car rental agencies, etc.). For example, the CRS 24 may store travel provider data regarding airline, train, and bus carrier schedules and fares, hotel accommodations and fares, rental car accommodations and fares, etc. The CRS 24 may comprise one or more computer servers and one or more computer databases that store and/or retrieve the travel data.

The operations center 12 may also comprise a number of other computer database systems. For example, the operations center 12 may comprise a user profile database 26 that stores data regarding end-users 14 of the system 10. For each registered end-user 14, the data may include: name, address, contact information, user ID, preferred service providers (preferred airline, hotel chain, etc.), account numbers (e.g., account numbers for airlines, hotel chains), etc. The operations center 12 may also comprise a journey database 28 that stores data regarding journeys of end-users 14 of the system 10. The databases 26, 28 may utilize database management systems (DBMSs) to organize and retrieve data stored in the databases 26, 28. The databases 26, 28 may be embodied as solid state memory (e.g., ROM), hard disk drive systems, RAID, disk arrays, storage area networks (SANs), and/or any other suitable system for storing computer data. Also, the databases 26, 28 may comprise caches, including web caches and database caches.

The servers 18, 20, 22 and databases systems 24, 26, 28 of the operations center 12 may be in communication with each other via computer networks, such as LAN, WANs, etc. The servers 18, 20, 22 and the database systems 24, 26, 28 may be embodied on separate physical machines or two or more of these components may be combined on the same physical machine.

Figure 2A:
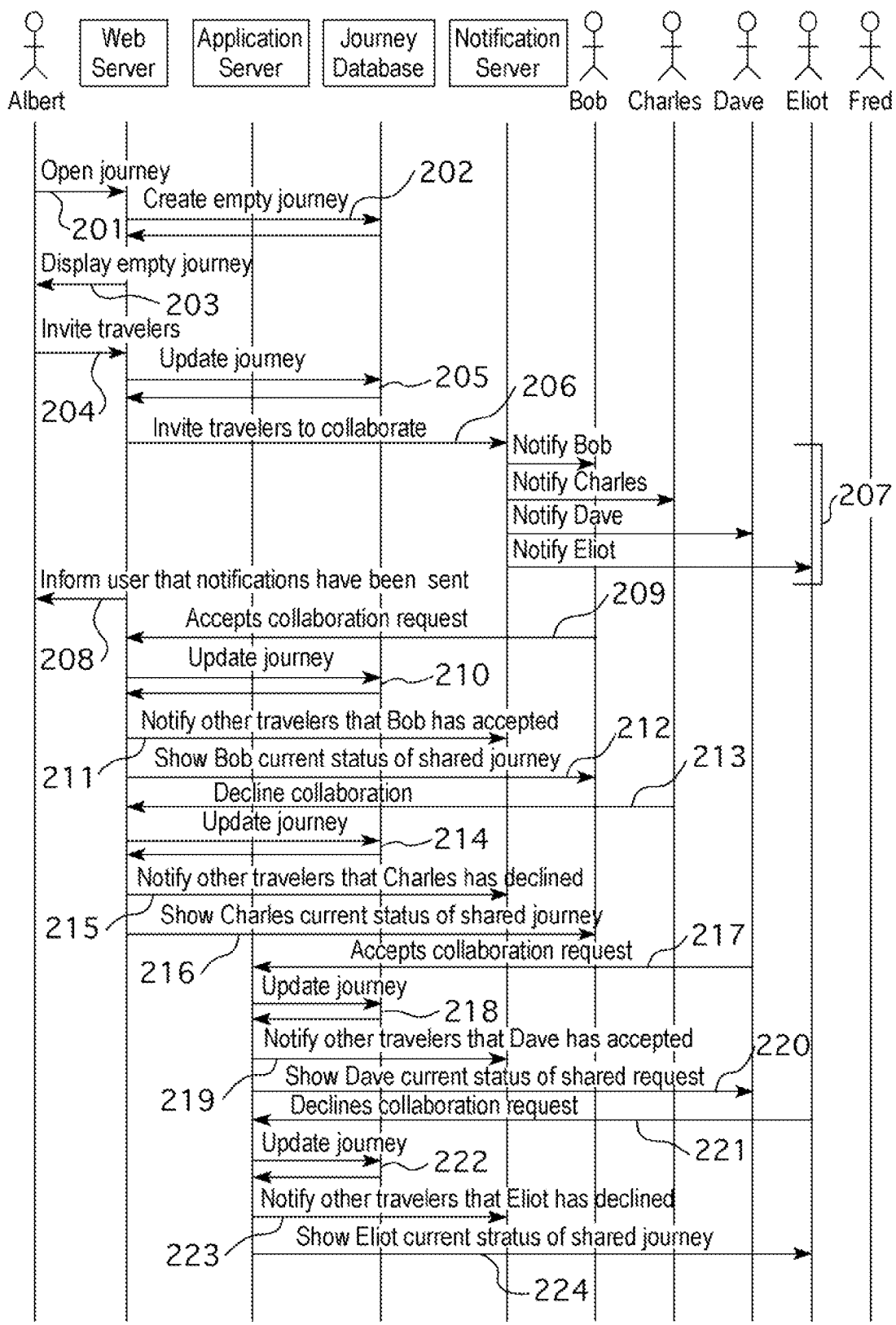
Figure 2B:
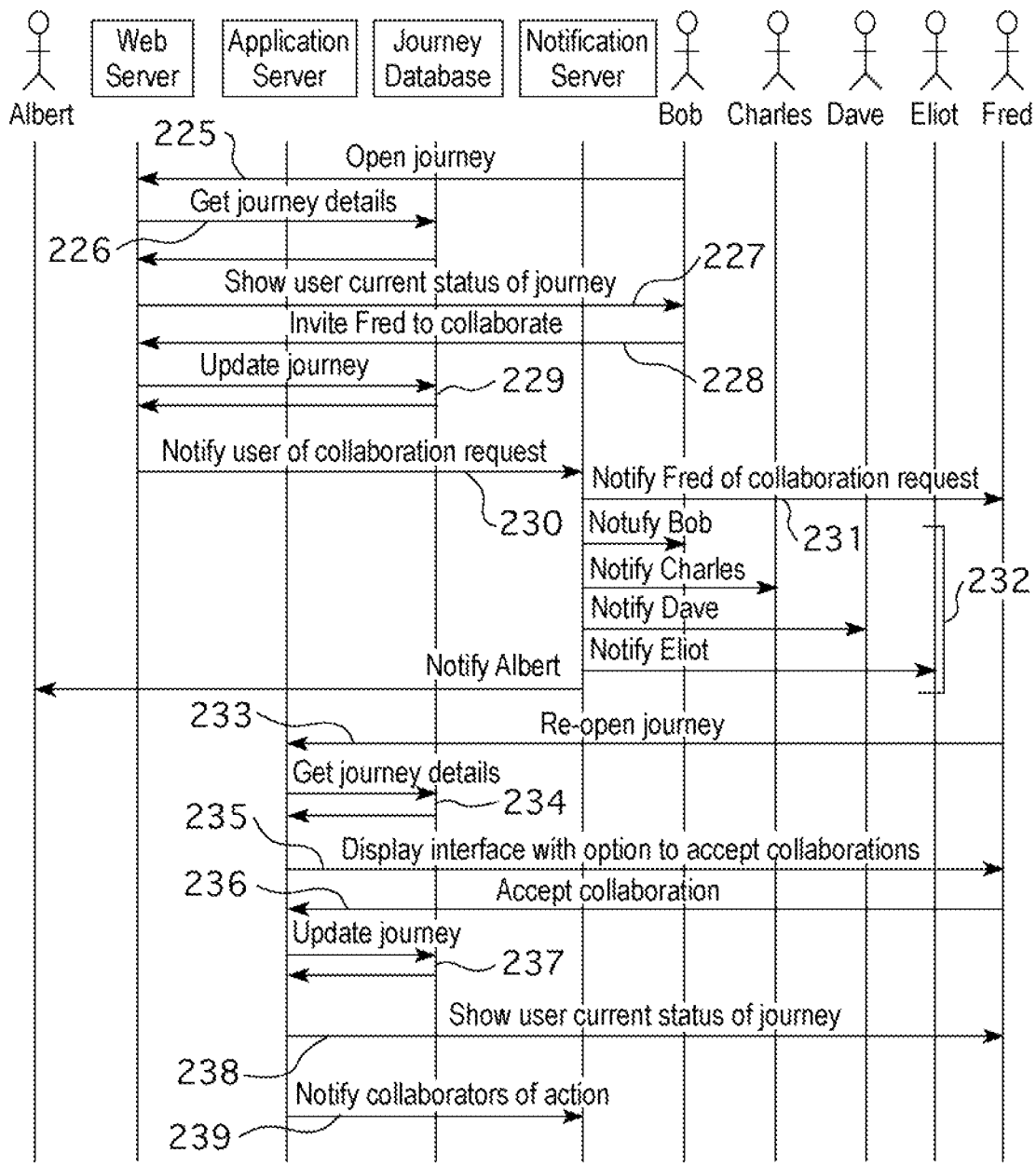

FIGS. 2a-b are diagrams collectively illustrating an example process for real-time collaborative travel planning for a journey according to various embodiments of the present invention. At step 201, a first traveler, "Albert," in this example, accesses a website hosted by the web server 18 with his client device. Using the interface provided by the website, Albert enters information to create a journey in the form of a journey record in the journey database 28 at step 202. Journey data, which may include information reflecting journey details, such as itinerary (e.g., destination, dates, and times) and traveling companions, may be stored in the journey database 28. The website interface then may display journey details, which are empty at this point in this example, to Albert at step 203.

Albert may then, though the website interface, request one or more other travelers, e.g., his traveling companions, to collaborate on the journey at step 204. In this example, Albert's initial selection of co-travelers includes Bob, Charles, Dave, and Eliot. For purposes of the description to follow, the journey is for Albert, Bob, Charles, Dave, and Eliot to attend a meeting where Albert specified the date, time, and location of or associated with the meeting as part of the journey.

At step 205, the journey database 28 is updated with Albert's collaboration request, and at step 206 the web server 18 informs the notification server 20 of the collaboration request. At step 207, the notification server 20 sends notifications to Albert's traveling companions of the collaboration requests via the network 16 and, at step 208, the web server 18 informs Albert that the collaboration requests have been sent to Albert's traveling companions. Notifications may take the form of electronic communications, such as emails, instant messages, text messages, faxes, and/or audio messages. Notifications may also be sent to end-user device addresses stored in the user profile database 26. For example, various device addresses for Albert's traveling companions may be stored in the user profile database 26 and the preferred means and/or addresses for communication for the user may be flagged. For example, if Bob prefers emails, the notification server 20 may send the collaboration request via email to Bob at an email address stored in the database 26. If Charles prefers a phone call, the notification server 20 may place an automated phone call to a destination number stored in the database 26. The users may also have other means for communication, such as text message, instant message, fax, etc. If no address information is stored in the database 26, the web server 18 may prompt Albert to enter contact information for an invited traveler.

The collaboration requests sent to the traveling companies may include a hyperlink or URL of a website or webpage hosted by the web server 18 where the traveling companions can either accept or reject the collaboration request for Albert's journey. For example, as shown in FIG. 2a, at step 209, Bob may access the website and accept the collaboration request. Consequently, at step 210, the journey database 28 may be updated to show that Bob has accepted the collaboration request. At step 211, the web server 18 may inform the notification server 20 that Bob has accepted the collaboration request, in which case, the notification server 20 may transmit a notification to each member of the traveling companions (including Albert) that Bob has accepted the collaboration request (not shown, but see step 207). At step 212, the web server's 18 user interface may display the current status of the journey for Bob.

As further shown in the example of FIG. 2a, if Charles cannot attend the meeting, Charles, at step 213, may access the website for the journey and decline the collaboration request. At step 214, the journey database 28 may be updated to indicate that Charles has declined the collaboration request. At step 215, the web server 18 may inform the notification server 20 that Charles has declined the collaboration request, in which case, the notification server 20 may transmit a notification to each member of the traveling companions (including Albert) that Charles has declined the collaboration request (see step 207). At step 216, the web server's 18 user interface may be updated to display the current status of the journey for Charles.

In some embodiments, instead of web-browser software, the users (e.g., the traveling companions) may have specialized software on their end-user devices that allows the user to accept or decline the collaboration requests without accessing the website hosted by the web server 18. Such users may communicate with the operations center 12 via the application server 22 over the network 16 with their specialized software. The users may download this software to their end-user device, such as over the network 16 from the web server 18 or another server, or they may install the software by other means, such as CD-ROM, etc.

In the example of FIG. 2a, Dave has installed such non-browser software on his computer device prior to Albert's collaboration request. Thus, at step 217, Dave's end-user device, using the specialized software, may communicate his response regarding the collaboration request to the application server 22. In this example, Dave accepted the collaboration request. At step 218, the journey database 28 may be updated to indicate that Dave has accepted the collaboration request. At step 219, the application server 22 may inform the notification server 20 that Dave has accepted the collaboration request, in which case the notification server 20 may transmit a notification to the members of the traveling companions that Dave has accepted the collaboration request (see step 207). At step 220, the user interface may be updated to display the current status of the journey for Dave.

In the example of FIG. 2a, at step 221, Eliot's end-user device, using the specialized software, may communicate his response regarding the collaboration request to the application server 22. In this example, Eliot declined the collaboration request. At step 222, the journey database 28 may be updated to indicate that Eliot has declined the collaboration request. At step 223, the application server 22 informs the notification server 20 that Eliot has declined the collaboration request, in which case the notification server 20 may transmit a notification via the network 16 to each member of the traveling party that Eliot has declined the collaboration request (see step 207). At step 224, the user interface may be updated to display the current status of the journey for Eliot.

Albert's invited traveling companions could also invite other travelers to join in the journey. FIG. 2b shows an example where Bob wishes also to invite Fred to the journey. At step 225, Bob may access a website for the journey hosted by the web server 18 to request access to the journey details. In response to Bob's request, the web server 18 may retrieve the journey data from the journey database 28 at step 226 and, at step 227, transmit the journey details to Bob via the user interface. At step 228, Bob may invite Fred to join via the web interface, and at step 229, the journey database 28 may be updated to indicate that Bob has invited Fred. At step 230, the web server 18 may notify the notification server 20 that Fred has been invited, and at step 231, the notification server 20 may send a collaboration request for the journey to Fred. At step 232, the notification server 20 also may send notifications to the other traveling companions that Fred has been invited. Fred may accept or decline the collaboration request as described above.

In certain embodiments, the journey creator, Albert in this case, may specify through a user interface to the operations center 12 certain permissions regarding collaboration requests, such as restricting which invited traveling companions are permitted to invite other travelers.

Invited traveling companions who initially reject a collaboration request may change their mind subsequently and accept the collaboration request. For example, assume in the example of FIG. 2b that Fred has declined the collaboration request. At step 233, Fred may access a website hosted by the web server 18 (or communicate with the application server 22 if Fred does not use a web browser to access the web server 18) to get the journey details. At step 234, the web server 18 (or the application server 22) may retrieve the journey data from the journey database 28 and, at step 235, transmit the relevant journey details to Fred via the network 16. Fred's end-user device 14 (personal computer, smart phone, etc.) may display the relevant journey details and provide Fred with the option to accept the collaboration request. At step 236, Fred may accept the collaboration request, which acceptance is transmitted via the network 16 to the web server 18 (or the application server 22). At step 237, the journey database 28 may be updated to indicate that Fred has accepted the collaboration request, and at step 238, the web server 18 (or the application server 22) may display the current status of the journey for Fred. In addition, the web server 18 (or the application server 22) may notify the notification server 20 at step 239 to transmit notifications via the network 16 to the other travelers that Fred has accepted the collaboration request.

Figure 3A:
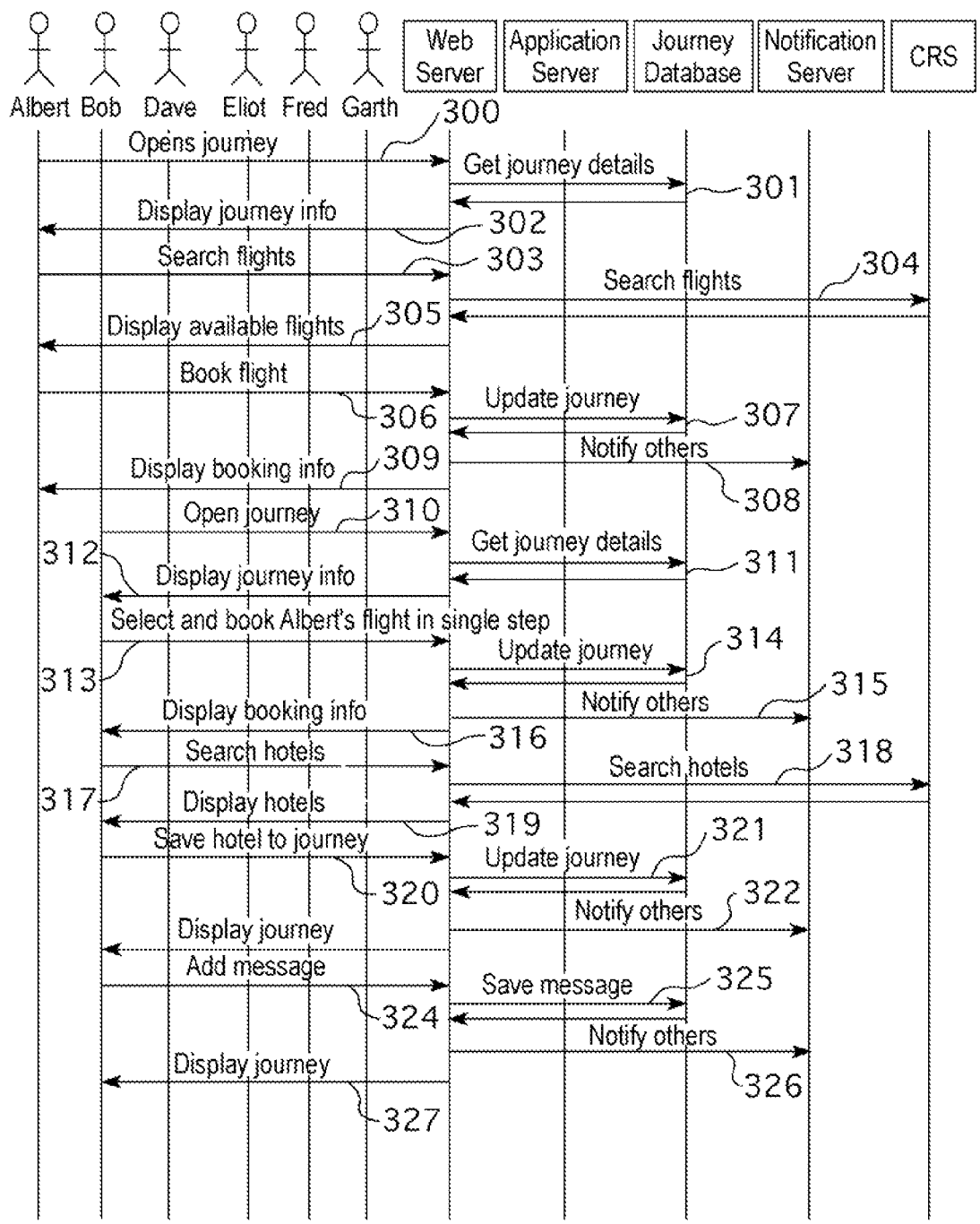
Figure 3B:
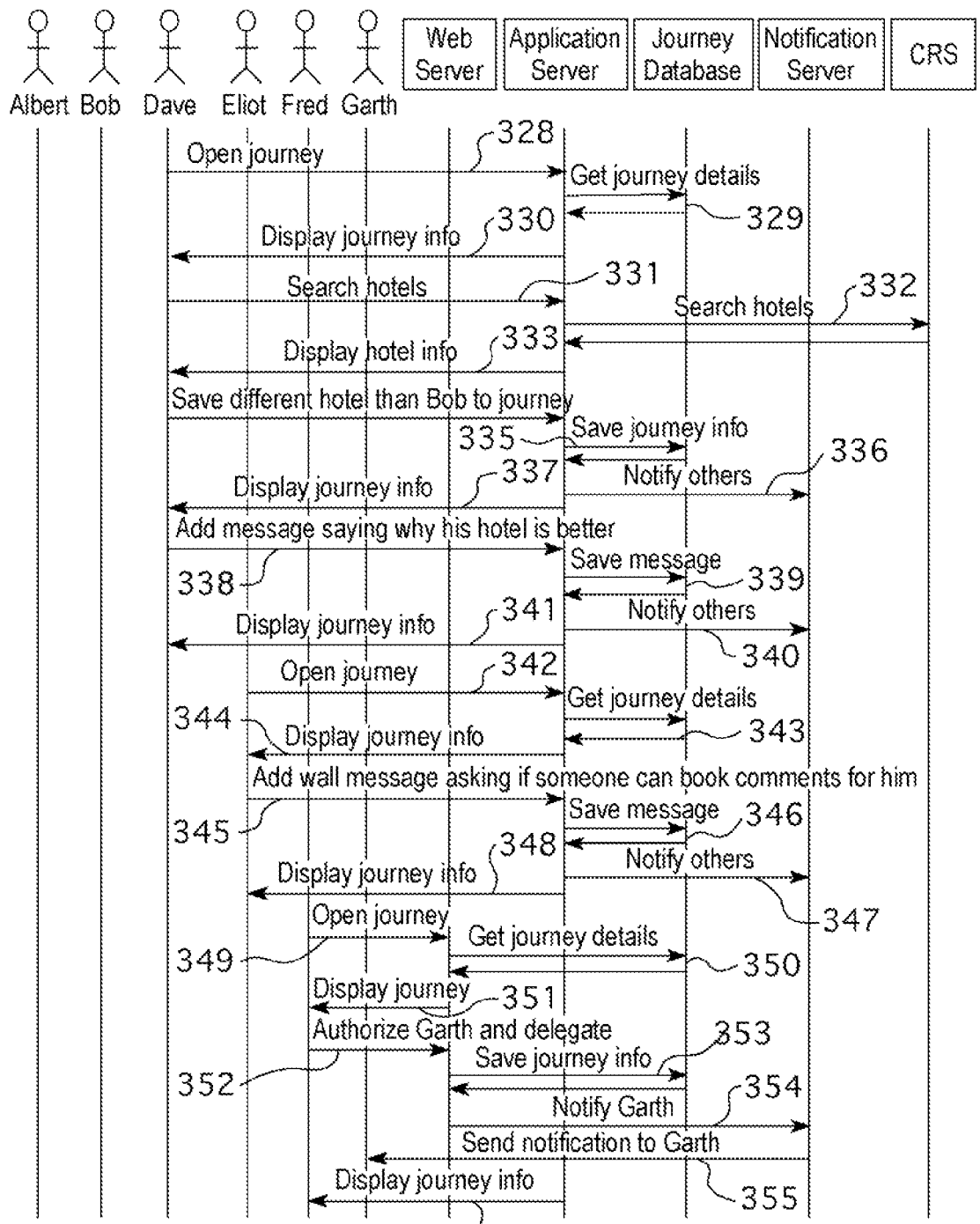
Figure 3C:
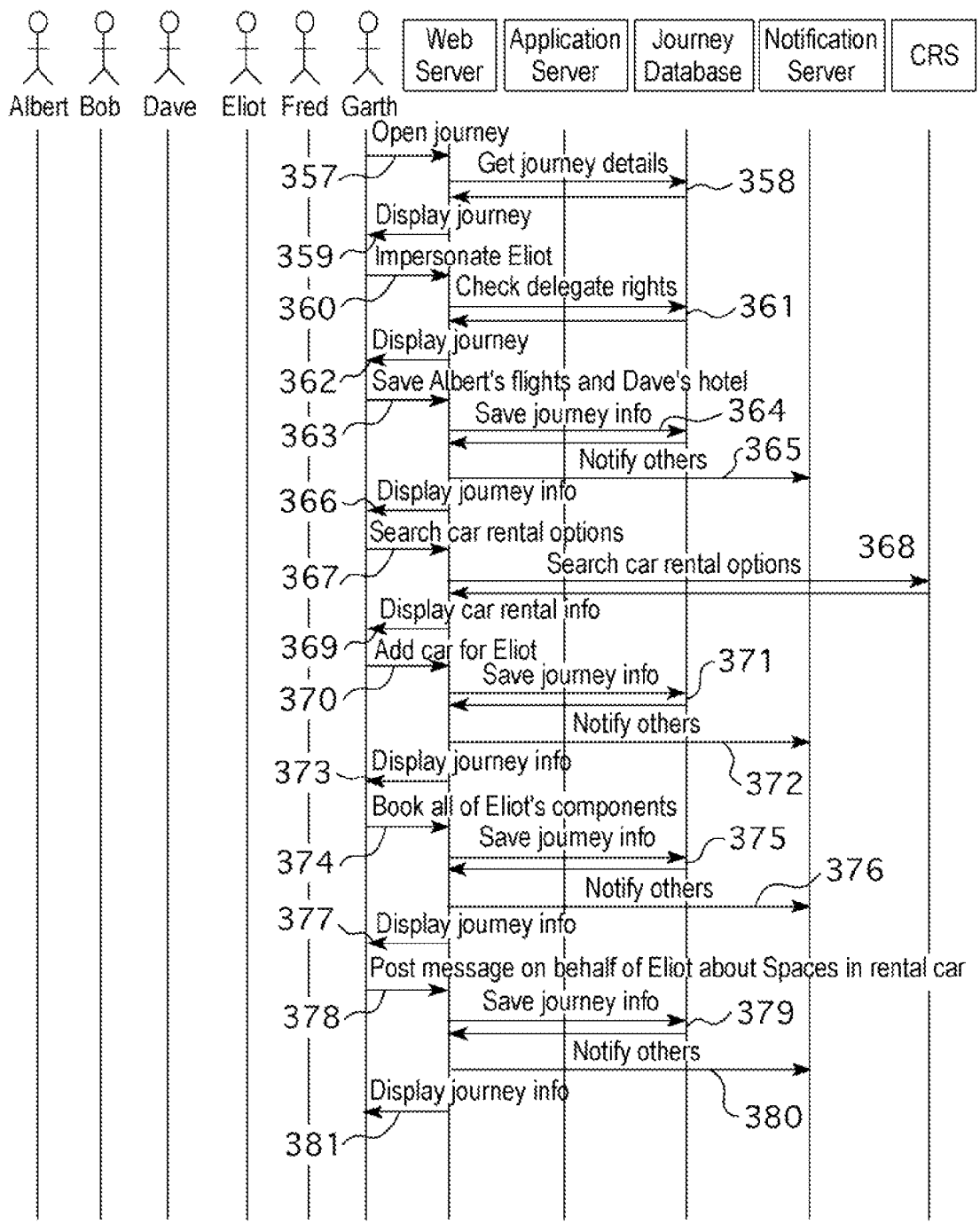

The travelers who accepted a collaboration request may use the operations center 12 to search for, tentatively select, and/or book itinerary options for the journey, including transportation (flight, rail, bus, etc.), lodging, rental car, etc. FIGS. 3a-c are diagrams collectively illustrating an example of how the travelers may use the operations center 12 to search for, select and/or book their travel options. At step 300, Albert may access the web server's 18 website from Albert's end-user device. At step 301, the web server 18 may retrieve relevant journey data from the journey database 28, and at step 302, transmit the relevant journey information via the network 16 to Albert.

The user interface for the website may provide the users with the ability to search for, select tentatively, and/or book travel options for the journey. For example, the website may comprise links, radio buttons, or other icons that when activated by the user, allow the user to search for accommodations associated with the journey, such as transportation, lodging, etc. In this example, assume Albert first wants to search for available flights to the meeting location. At step 303, Albert, using the web interface, selects to search flights, and the web server 18, at step 304, retrieves relevant airline data from the CRS 24 given Albert's departure location (which may be stored in the user profile database 26 or entered by Albert through the web interface), the destination of the journey (which is stored in the journey data), and the date/time for the journey (also stored in the journey data). The CRS 24 may retrieve the relevant flight information, which may include: the carrier, the departure time and place, the arrival time and place, the flight number, the number of connections, the rate, etc. At step 305, the potential flight options may be displayed for Albert through the web interface.

The web interface also may allow Albert (or any other traveler) to select and/or book one of the displayed travel options (e.g., displayed flight options). For example, if Albert selects to book one of the displayed flights at step 306, the journey database 28 may be updated to include Albert's flight information for the journey at step 307. In addition, the CRS 24 will communicate with the airline to book Albert's flight. In addition, at step 308, the other traveling companions may be notified via the network 16 that Albert has booked a flight for the journey. Similarly, at step 309, the web server 18 may transmit confirmation of the booked flight to Albert via the web interface. In a similar manner, Albert could search for, select, and/or book other itinerary components for the journey, such as hotel accommodations, car rentals, restaurant reservations, etc. The CRS 24 (or other applicable computer system) may search for travel components that meet Albert's entered criteria. When Albert books a particular itinerary component (e.g., hotel accommodations, car rentals, restaurant reservations, etc.), notifications may be sent by the notification server 22 and the journey web site may be updated to display Albert's booked travel components. The user interface also preferably permits Albert to tentatively select an itinerary component (e.g., flight, hotel, etc.), without booking it. Such tentatively selected itinerary components may be stored in the database 28, sent in notifications to the other traveling companions, and displayed on the user interface, as described below.

At step 310, Bob may access a website hosted by the web server 18 to open the journey. At step 311, the web server 18 may retrieve the relevant journey data from the journey database 28 and, at step 312, the web server 18 may transmit the journey information to Bob via the network 16. Because Albert has already booked a flight for the journey, the journey details displayed for Bob may include information regarding Albert's flight and an option for Bob to select and book Albert's flight for himself as well. Similarly, if Albert has tentatively selected a flight, but had not yet booked it, Albert's tentative flight may be shown on the user interface and Bob may be provided with the option of tentatively selecting or even booking for himself the same flight as Albert. These options are obviously more valuable to Bob if he has the same origination location as Albert. In this example, therefore, Bob may select and/or book Albert's flight for himself at step 313, and the journey database 28 may be updated to include Bob's flight information at step 314. At step 315, the notification server 20 may cause notifications to be sent to the other travelers indicating that Bob has selected and/or booked a flight for the journey. At step 316, the web server 18 may transmit confirmation of the booked flight to Bob via the web interface. In a similar manner, Bob (and the other travelers) may select and/or book other itinerary components of Albert.

In a similar manner, when and if Bob selects and/or books other itinerary components for the journey (e.g., hotel accommodations, car rentals, restaurant reservations, etc.), notifications may be sent by the notification server 22 to the traveling companions and the journey web site may be updated to display Bob's selected and/or booked itinerary components. For example, in the illustrated example, Bob also is interested in searching for and booking hotel accommodations for the journey. At step 317, using the web interface, Bob may select the option to search for hotels. At step 318, the CRS 24 may search for relevant hotel information given the journey destination details and, at step 319 the relevant hotel search results may be displayed for Bob via the web interface. The relevant hotel search results may comprise options that Bob can select and/or book. The hotel information may include: hotel location, rates, types of rooms available, and other pertinent information. In this example, if Bob is interested in merely selecting tentatively hotel accommodations at this point and not necessarily booking his hotel without further input from his traveling companions, Bob may select to save (or tentatively select) a particular hotel for the journey at step 320. Bob's selection may include his tentative check-in and check-out dates. The journey database 28 may then be updated to indicate that Bob has selected (but not yet booked) a hotel at step 321. The journey database 28 may also store details about the hotel, including: the name, location, check-in date, check-out date, rate, etc. At step 322, the notification server 20 may cause electronic notifications to be sent to the members of the traveling party via the network 16 indicating that Bob has selected a hotel for the journey. In addition, at step 323, the web server 18 may transmit confirmation of the selected hotel to Bob via the web interface.

In various embodiments, the user interface provided by the web server 18 (or the application server 22, as the case may be) may allow users to post and view messages about the journey, in a manner similar to an online chat session. Using such a message board or chat session, the users can collaborate on their travel plans in real time. Example interfaces with the chat display are shown in FIGS. 4-13, which are described further below. Through the interface, the travelers can view booked and/or tentatively selected travel arrangements of their traveling companions. The messages may pertain to aspects of the journey (e.g., preferred carriers, preferred hotels, meeting times and locations, etc.). In the illustrated example, at step 324, Bob posts a message asking the other travelers whether his selected hotel is acceptable. At step 325, the journey database 28 may be updated to store Bob's message, and at step 326, the notification server 20 may be caused to send notifications to the other travelers that Bob has added a message to the journey that can be viewed on a user interface. At step 327, the web server 18 may transmit confirmation of the message to Bob via a web interface.

Continuing on to the other travelers (and FIG. 3*b*), because Dave accesses the journey using non-browser software on his end-user device, at step 328 Dave may access the application server 22 using the non-browser software to open the journey. At step 329, the relevant journey data may be retrieved from the journey database 28 and, at step 330, journey information transmitted from the application server 22 via the network 16 to Dave's end-user device.

The journey details displayed to Dave may include Albert's booked flight information and Bob's selected hotel. The user interface may provide Dave with the option of selecting and/or booking either Albert's flight and/or Bob's hotel, or searching for and selecting/booking his own flight and/or hotel (and other itinerary components for the journey). In the illustrated example, at step 331, Dave selects the option to search for hotels for the journey. At step 332, the application server 22 (or the web server 18 as the case may be) communicates to the CRS 24, which searches for relevant hotel information. At step 333, the application server 22 (or the web server 18 as the case may be) transmits the relevant hotel information from the search via the network 16 to Dave's end-user device. The relevant hotel information may include lodging options that Dave can select and/or book for the journey.

In this example, Dave selects a different hotel from Bob at step 334. At step 335, the journey database 28 is updated to include data regarding Dave's selected hotel. At step 336, the notification server 20 may cause notifications to be sent to the members of the traveling party via the network 16 indicating that Dave has selected a hotel for the journey. In addition, at step 337, the application server 22 (or the web server 18 as the case may be) may transmit confirmation of the selected hotel to Dave via the user interface.

In this example, Dave also posts a message to the journey at step 338. The message may state, for example, that Dave' selected hotel is preferable to Bob's selected hotel. At step 339, Dave's message is stored in the journey database 28 and, at step 340, the notification server 20 causes notifications to be sent via the network 16 to the other traveling parties of Dave's new message. At step 341, the updated journey information is displayed for Dave.

Continuing in this example, Eliot may access the journey via the web server 18 (or application server 22, as the case may be) at step 342, and the web server 18 (or application server 22) may retrieve the relevant data for the journey from the journey database 28 at step 343. Journey information may then be transmitted to Eliot's end-user device via the network 16 at step 344. In this example, Eliot also posts a message regarding the journey at step 345. Eliot's message is a request for someone to book his arrangements for the journey because he does not have the time. At step 346, Eliot's message may be saved to the journey database 28, and at step 347 the notification server 20 may be caused to send notifications to the other travelers that Eliot has added a message to the journey. At step 348, updated journey information is displayed for Eliot.

Other persons, who may or may not be part of the traveling party, may be authorized to act as delegates for one or more of the members of the traveling party to book their travel arrangements for the journey. In the example, because Eliot does not have time to book his arrangements, a delegate may be appointed on his behalf. In this example, Fred appoints Garth to act as Eliot's delegate. If so authorized, Fred could have appointed one of the traveling companions or himself to act as Eliot's delegate. To appoint Garth as Eliot's delegate, at step 349, Fred may access the journey via the web server 18 (or application server 22, as the case may be) and, at step 350, and the web server 18 (or application server 22) may retrieve the relevant data for the journey from the journey database 28. The journey information may then be transmitted to Fred's end-user device via the network 16 at step 351. In response to Eliot's message, Fred may authorize Garth as a delegate for this journey only to act on Eliot's behalf at step 352. At step 353, Garth's status as a delegate for Eliot may be stored in the journey database 28 and/or the user profile database 26. In addition, at step 354, web server 18 may instruct the notification server 20 to contact Garth and, at step 355, the notification server 20 may cause a notification to be sent via the network 16 to Garth at an address associated with Garth. At step 356, the updated journey information is displayed for Fred.

Continuing onto FIG. 3c, in response to the notice, at step 357 Garth may access the journey via the web server 18 (or application server 22, as the case may be) and, at step 358, the web server 18 (or application server 22) may retrieve the relevant data for the journey from the journey database 28. At step 359, the web server 18 may transmit journey information to Garth via the network 16. At step 360, Garth may select an option to act as Eliot's delegate via the web server's 18 user interface. At step 361, Garth's credentials and authorization to act as Eliot's delegate may be verified through the user profile database 26 and/or the journey database 28. If it is verified that Garth is authorized to act as Eliot's delegate, the journey information may be displayed for Garth via the interface at step 362. Garth may then select and/or book travel arrangements for Eliot through the user interface, as well as post messages. In the illustrated example, Garth selects Albert's flight and Dave's hotel for the journey for Eliot at step 363. Eliot's selections may then be stored in the journey database 28 at step 364, and at step 365 the notification server 20 may cause notifications to be sent to the other traveling companions via the network 16 of Eliot's selections. At step 366, confirmation of the selections may also be sent to Garth.

In various embodiments, the system 10 may also permit users to search for, tentatively select, and book other itinerary components for the journey, such as car rentals. In the illustrated example, Garth, acting as Eliot's delegate, selects an option to search car rentals via the interface for the journey at step 367. At step 368, the CRS 24 may search for relevant car rental options given the journey itinerary, and the search results (which may comprise options for Garth to select or book) may be transmitted via the network 16 to Garth at step 369. At step 370, Garth may select or book a car rental option on Eliot's behalf, and at step 371 the car rental details may be stored in the journey database 28. In addition, at step 372 the notification server 20 may cause notifications to be sent to the other traveling companions via the network 16 of Eliot's selection or booking of a car rental for the journey. At step 373, confirmation of the car rental selection for Eliot may also be sent to Garth, acting as Eliot's delegate.

As mentioned above, through a user interface, a traveler can select tentative, unbooked components of the journey as well as book components of the journey. Journey or itinerary components in this application refers to items of the journey that can be arranged and booked, such as transportation, lodging, rental cars, restaurant reservations, show tickets, etc. In addition, according to various embodiments, a user may initiate the process of booking all unbooked components of the journey at once, by selecting a "book unbooked components" or similar icon on the user interface, rather than having to book serially and individually the unbooked components. For example, at step 374, Garth may transmit a message via a user interface to the operations center 12 to book all of Eliot's selected, unbooked travel arrangements. At step 375, the updated journey information may be saved in the journey database 28. In addition, the CRS 24 may cause the selected, unbooked components to be booked. At step 376, the traveling companions may be notified that components of Eliot's journey have been booked by the notification server 22 and, at step 377, Garth, acting as Eliot's delegate, may receive confirmation of the booked journey components.

The collaborative aspects of the system 10 allow the traveling components to deliver messages via the interface that coordinate travel itineraries. For example, in the example of FIG. 3, at step 378, Garth, acting at Eliot's delegate, may post a message on the user interface stating that Eliot has spaces in Eliot's rental car in case other users desire to share a ride in Eliot's rental car. The message may be stored to the journey database 28 at step 379. As before, notifications of the message may be sent to the other travelers at step 380, and the updated journey information may be displayed for Garth at step 381.

In a similar manner, the other traveling companions (and/or their authorized delegates) may access the journey details hosted by the operations center 12 and select and/or book components of their journey.

In addition, according to various embodiments, when a traveler (and/or his/her authorized delegate) changes a component of their journey itinerary, the other members of the journey may be notified of the change. For example, if Albert changes his flight, the notification server 20 may send notifications to the other traveling companions of the change in Albert's itinerary. Similarly, the journey database 28 may be updated and Albert's updated itinerary may be displayed on the user interface. Also, when a traveler cancels any part of their itinerary selections, the other traveling companions may be notified. In that way, the traveling companions can be updated as to changes in the itinerary of one of their traveling companions.

The interface provided by the web server 18 (or the application server 22 as the case may be) also may be used to update the traveling companions of events throughout the journey, according to various embodiments. For example, the CRS 24 may be in communication with the travel providers, such as airlines, etc., and may be notified when flights, trains, buses, etc. are delayed. The journey database 28 may be updated with data regarding delays from the CRS 24 when the CRS 24 receives such information. When the journey database 28 receives the delay information, a message detailing the delay(s) may be posted on the interface for the journey. That way, the travelers can check the interface throughout the journey to check the status of their traveling companions. In addition, the notification server 20 may cause notifications about the delay to be sent to the members of the traveling party. In addition to just delays, messages could be posted and/or delivered when flights, trains, buses depart from the originating location and/or arrive at their destination.

In addition, in various embodiments, the traveling companions also may continue to convey messages throughout the journey so that the other traveling companions can stay abreast of any changes in plans, etc. For example, if a particular traveler has missed his/her flight, the traveler could post a message notifying the other traveling companions. The notification server 20 may send notifications of the new message to the other traveling companions. Similarly, if one of the travelers had to cancel the trip at a late moment, the traveler could post a message to that effect.

Figure 4:
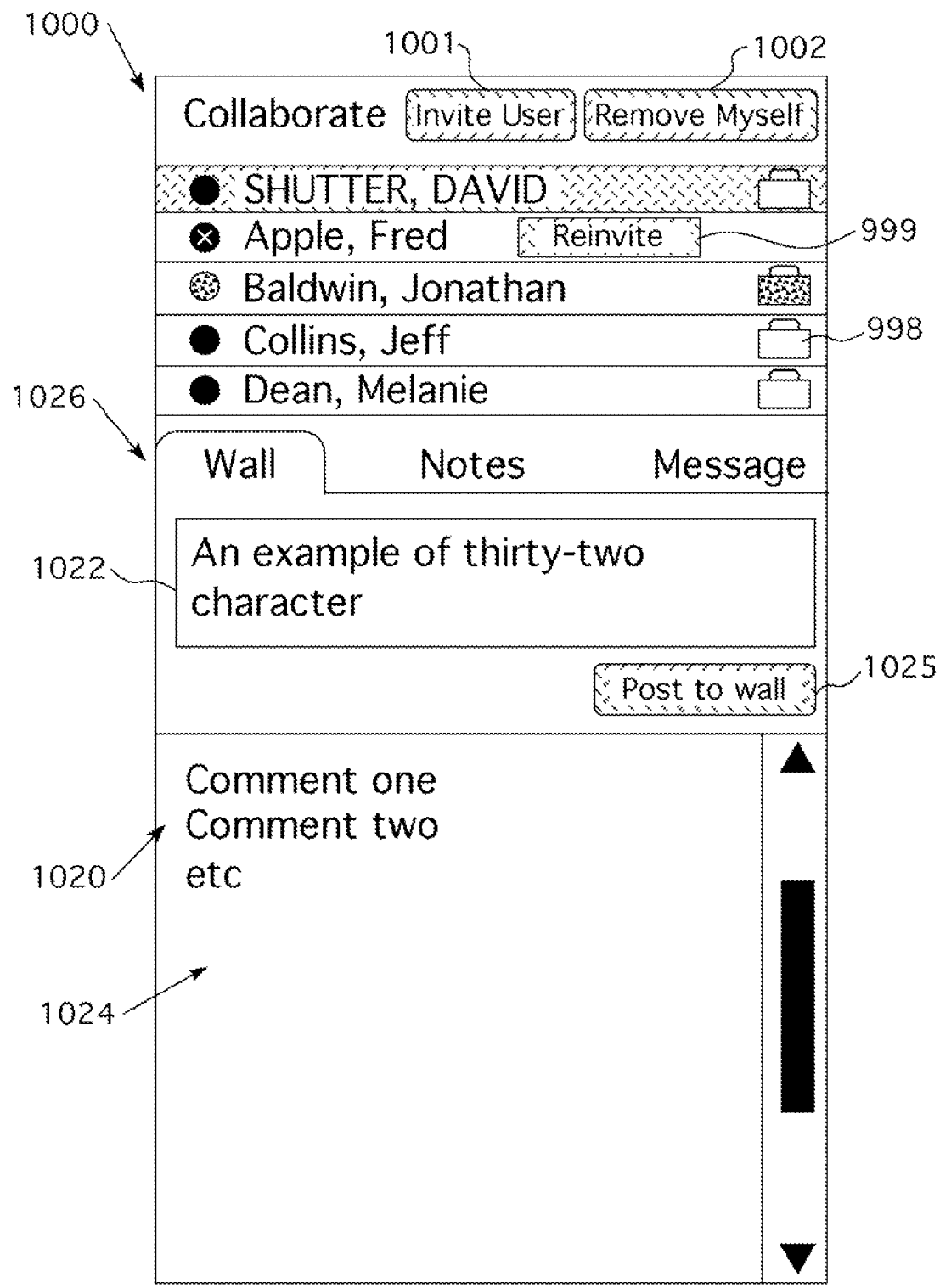

FIGS. 4-13 show example screen shots of a user interface 1000 that a member of the traveling party (and/or their delegate) may view when they access the operations center 12 from their end-user devices. The interface 1000 may be provided by the web server 18 or the application server 22, as the case may be, depending on the end-user's access method. As shown in FIG. 4, the interface 1000 may show a list of the travelers invited to collaborate on the journey. In various embodiments, the interface 1000 may include visual indicators that indicate whether: (i) the traveler has accepted or declined the collaboration request; (ii) the traveler has selected and/or booked a component of their journey or not; and (iii) the traveler is currently available online for a chat session via the interface.

In the illustrated example of FIG. 4, a circle with an "x" through it next to a traveler's name indicates that the corresponding traveler has declined the collaboration request. In the illustrated example, Fred Apple has declined the invitation to collaborate. In addition, an icon 998, such as the suitcase shown in FIG. 4, next to the traveler's name may indicate that the corresponding traveler has accepted the collaboration request, and the absence of the icon without a "reinvite" button 999 (or similar icon) may indicate that the corresponding traveler has not yet accepted or declined the collaboration request. In the example of FIG. 4, David Shutter, Jonathan Baldwin, Jeff Collins, and Melanie Dean have accepted the collaboration request as indicated by the suitcase 998 next to their respective names, and Fred Apple has declined the collaboration request. One of the travelers/users could reinvite Fred by activating the "reinvite" or similar button 999, which would cause the notification server 20 to transmit another communication (e.g., email) to the traveler who has declined the collaboration request (e.g., Fred) re-inviting the traveler to accept the collaboration request. In the illustrated embodiment, if there was no "reinvite" button 999 next to Fred's name, that would indicate that Fred has not accepted or declined the collaboration request yet (because there also is no suitcase icon next to Fred's name). In other embodiments, different icons or indications may be used to indicate that an invited traveler has accepted or declined the collaboration request, or whether he/she has not yet responded to the invitation.

In various embodiments, circles without an "x" next to the travelers names may visually indicate whether the corresponding traveler is available online for a chat or message session. For example, a first colored circle (e.g., green) may indicate that the corresponding traveler is currently available for chatting and a second colored circle (e.g., gray) may indicate that the corresponding traveler is not currently available. In the illustrated example, David Shutter, Jeff Collins, and Melanie Dean are available presently online, and Jonathan Baldwin is not. In other embodiments, different indicators may be used to indicate whether somebody is available or not.

In one embodiment, as shown in FIG. 4, the color of the icon 998 may indicate whether the corresponding traveler has selected/booked any of their itinerary components or not for the journey, e.g., whether they have tentatively selected components of the journey and/or booked components of the journey. For example, in the illustrated embodiment, a first colored icon 998 may indicate that the corresponding traveler has selected or booked at least one component of their journey (e.g., transportation, lodging, etc.), and a second colored icon 998 may indicate that the corresponding traveler has not yet selected or booked any components of their journey. In the illustrated embodiment, David Shutter, Jeff Collins, and Melanie Dean have selected and/or booked at least one component of their journey, and Jonathan Baldwin has not yet selected/booked any components of his journey. Of course, in different embodiments, different visual indicator conventions and/or different colors could be used to indicate the various statuses of the invited travelers.

The interface 1000 may also include an "invite user" button 1001 and a "remove myself" button 1002 in various embodiments. By activating the "invite user" button 1001, the user can invite an additional person to collaborate on the journey. By activating the "remove myself" button 1002, the user can remove him/her from the journey, e.g., decline the request for collaboration. In other embodiments, different displays/controls may be used to invite or remove somebody.

The interface 1000 may also include the message field 1020. In various embodiments, the message field 1020 may allow the user to post and view public and/or private posts. Public posts refer to posts that are accessible in the message field 1020 by every traveler invited to the collaboration. Private posts refer to posts that are accessible in the message field by only selected travelers. In the illustrated embodiment, the public post portion of the message field is referred to as the "Wall," although in other embodiments different names obviously could be used. If a user desires to post a public message, the user could type their message in the text field 1022 and then activate the "Post to wall" or similar button 1025 to post their message to the message field 1020. The publicly posted comments, including comments from all of the users who have posted comments, may appear in the post field 1024 when the "Wall" option in the menu 1026 is selected.

Figure 5:
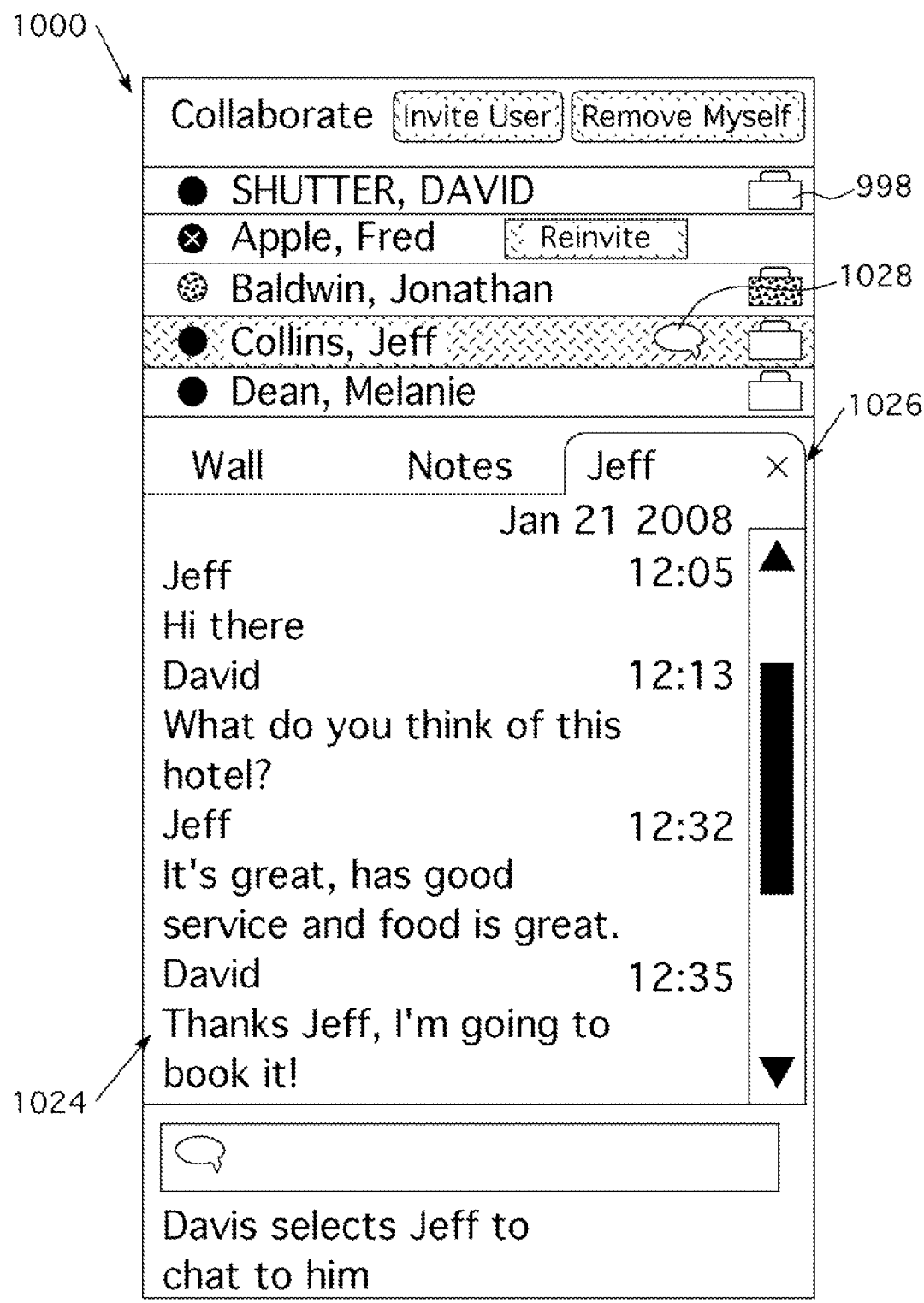
Figure 6:
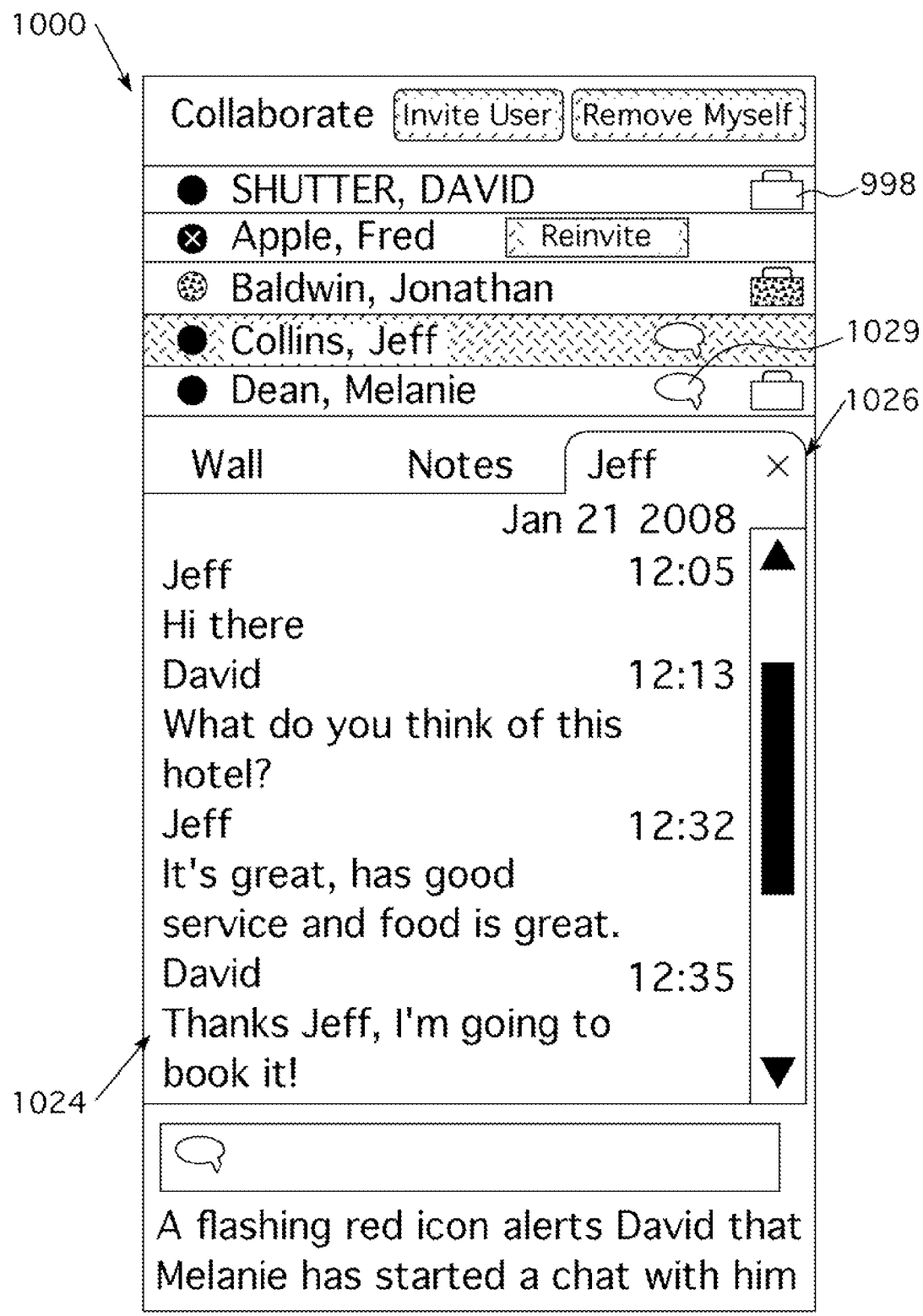
Figure 7:
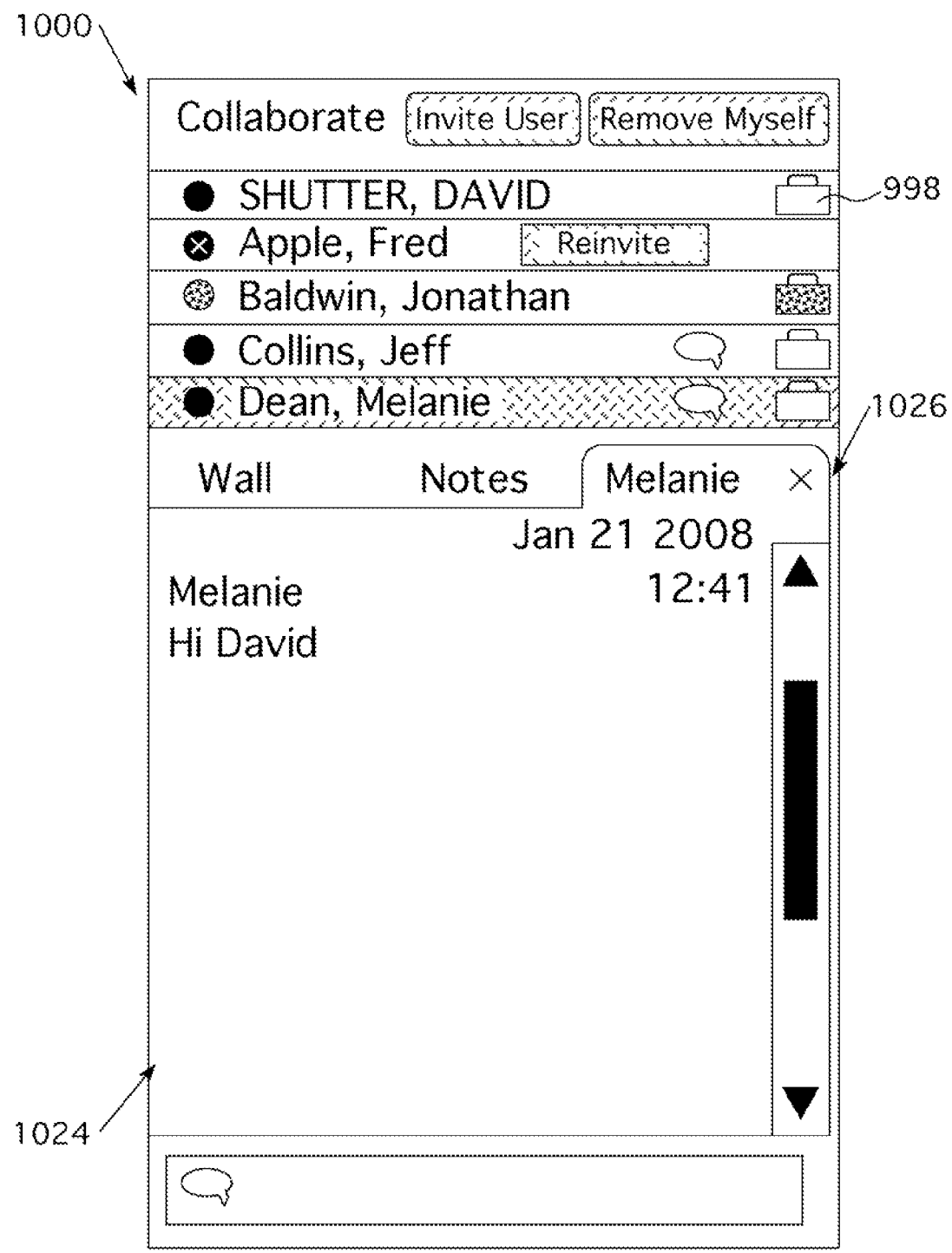

In various embodiments, a user can post and view private posts by clicking on or otherwise activating the name of the person with whom the user desires to engage in a private chat session. In the example of FIG. 5, the user (David Shutter) has selected Jeff Collins for a private chat. As such, Jeff's name appears in the menu 1026, with the contents of the chat session displayed in the field 1024. The balloon icon 1028 next to Jeff's name indicates that David is conducting a chat with Jeff. If Melanie were to post a private message for David, a flashing balloon icon 1029 may appear next to Melanie's name in various embodiments, as shown in FIG. 6. The user (David in this example) could view Melanie's private post by clicking on or otherwise activating the link on Melanie's name, in which case Melanie's name appears in the menu 1026 and the private posts to/from Melanie appear in the field 1024, as shown in FIG. 7. Of course, in other embodiments, different indicators and conventions may be used to indicate the status of a chat session.

Figure 8:
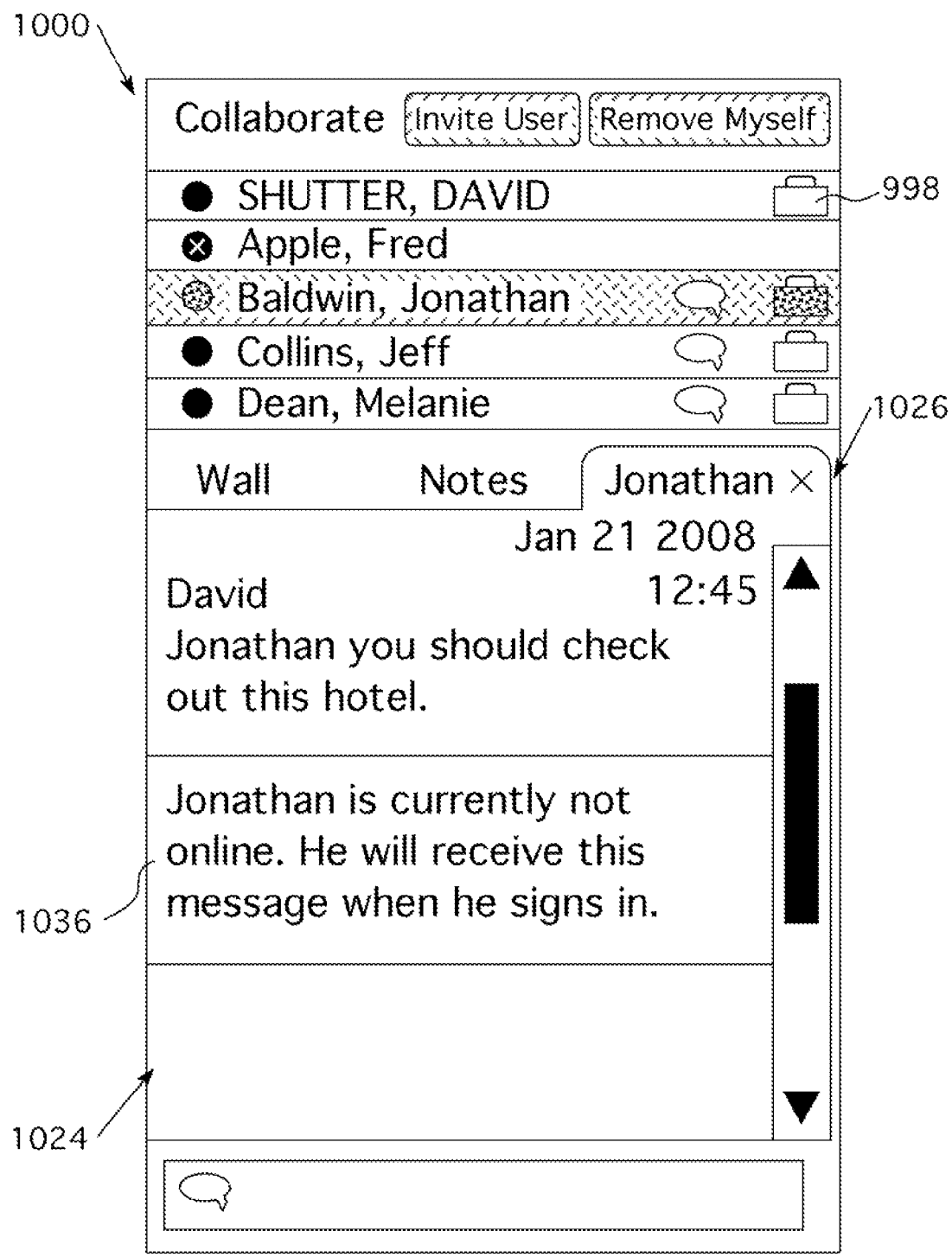

As shown in the example of FIG. 8, if the user were to select for a chat session a traveler who is not currently online and available for chat, e.g., Jonathan in the example of FIG. 8, a message 1036 may appear in the post field 1024 indicating that Jonathan is not available.

Figure 9:
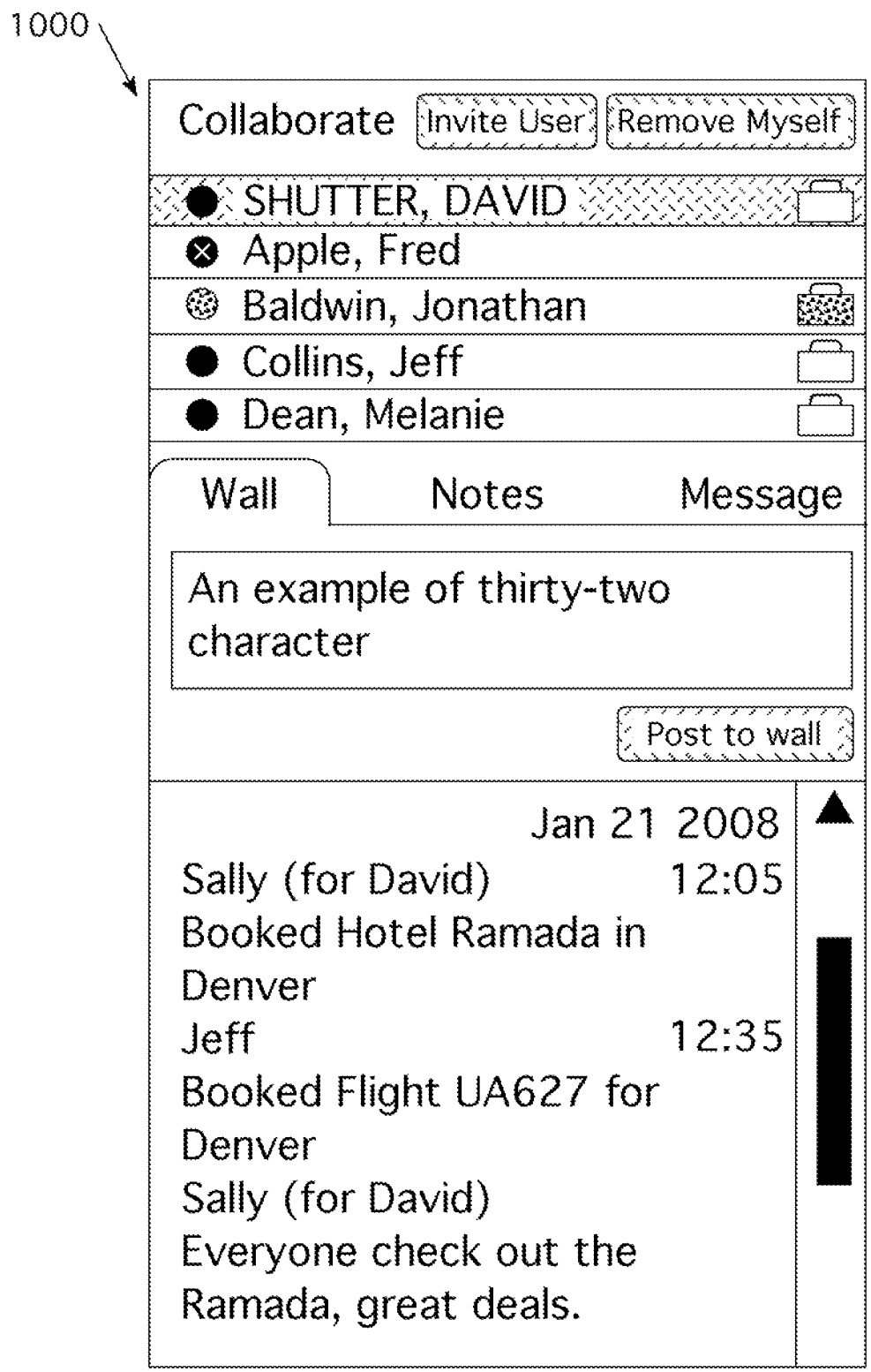

As shown in the example of FIG. 9, an authorized delegate could post and view public messages for the delegate's associated traveler, but in various embodiments, the delegate would not be permitted to post and/or view private messages. In the example of FIG. 9, Sally is a delegate for David.

Figure 10:
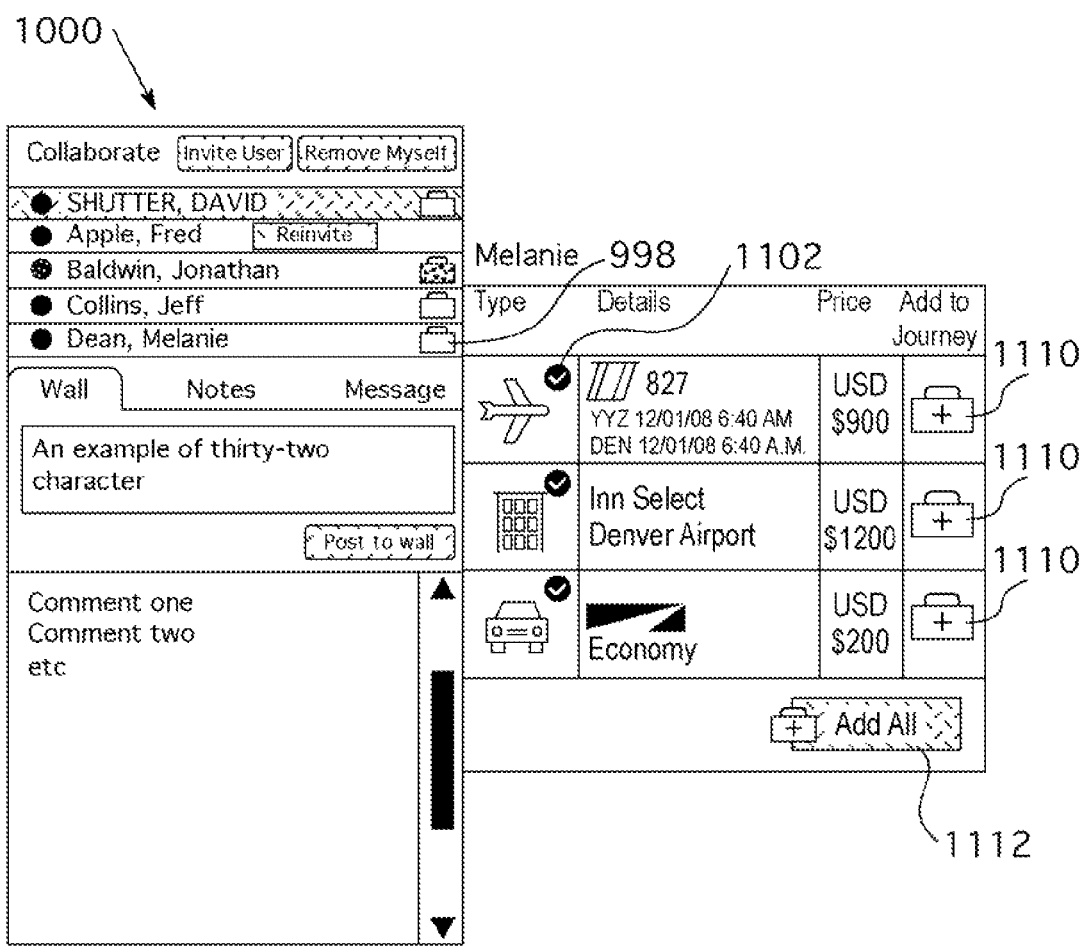

In various embodiments, the user could also view the itinerary components of the other travelers. In one embodiment, as shown in FIG. 10, clicking on or otherwise activating the link for the suitcase icon 998 for a traveler may cause an itinerary component window 1100 to appear that shows details of the traveler's itinerary components. The example window 1100 in FIG. 10 shows the components of Melanie's itinerary. In the illustrated example, Melanie has booked a flight, a hotel, and rental car. The applicable rate for each component is also shown in the window 1100. In the illustrated embodiment, the fact that Melanie has booked the listed components is indicated by the checkmark 1102 for each component. FIG. 11 shows an example itinerary component window 1100 for Jeff. The plus sign 1104 for Jeff's hotel reservation shows that Jeff has selected the hotel, but has not yet booked it. The checkmark 1102, however, next to the rental car icon for Jeff shows that Jeff as booked his rental car. Of course, in other embodiments different indicator conventions could be used.

In various embodiments, the user (David in the illustrated example) may add individual components of another traveler's journey to the user's journey by clicking on or otherwise activating the add component icon 1110, or the user could add all of the components of another traveler's journey by clicking on or otherwise activating the "add all" icon 1112. The "add all" icon 1112 is a convenient way for a user to add multiple appealing components of another traveler to his/her journey with one click. When the user selects a component of another traveler in such a manner, the CRS 24 may reserve or book the appropriate component, the journey database 28 may be updated to include data for the component, and notifications may be sent to the other travelers, as described above. Also as described above, the user interface may be updated to show the selected/booked component for the appropriate traveler.

FIG. 12 is an example of another itinerary component window 1100. It shows that a traveler could select/book reservations or tickets for various points of interest associated with the journey, such as restaurants, shows, museums, etc. The user could click on or otherwise activate the link for the points of interest to view more details, and could individually add each of them to the user's journey by selecting the add component icon 1110.

Figures 13A, 13B:
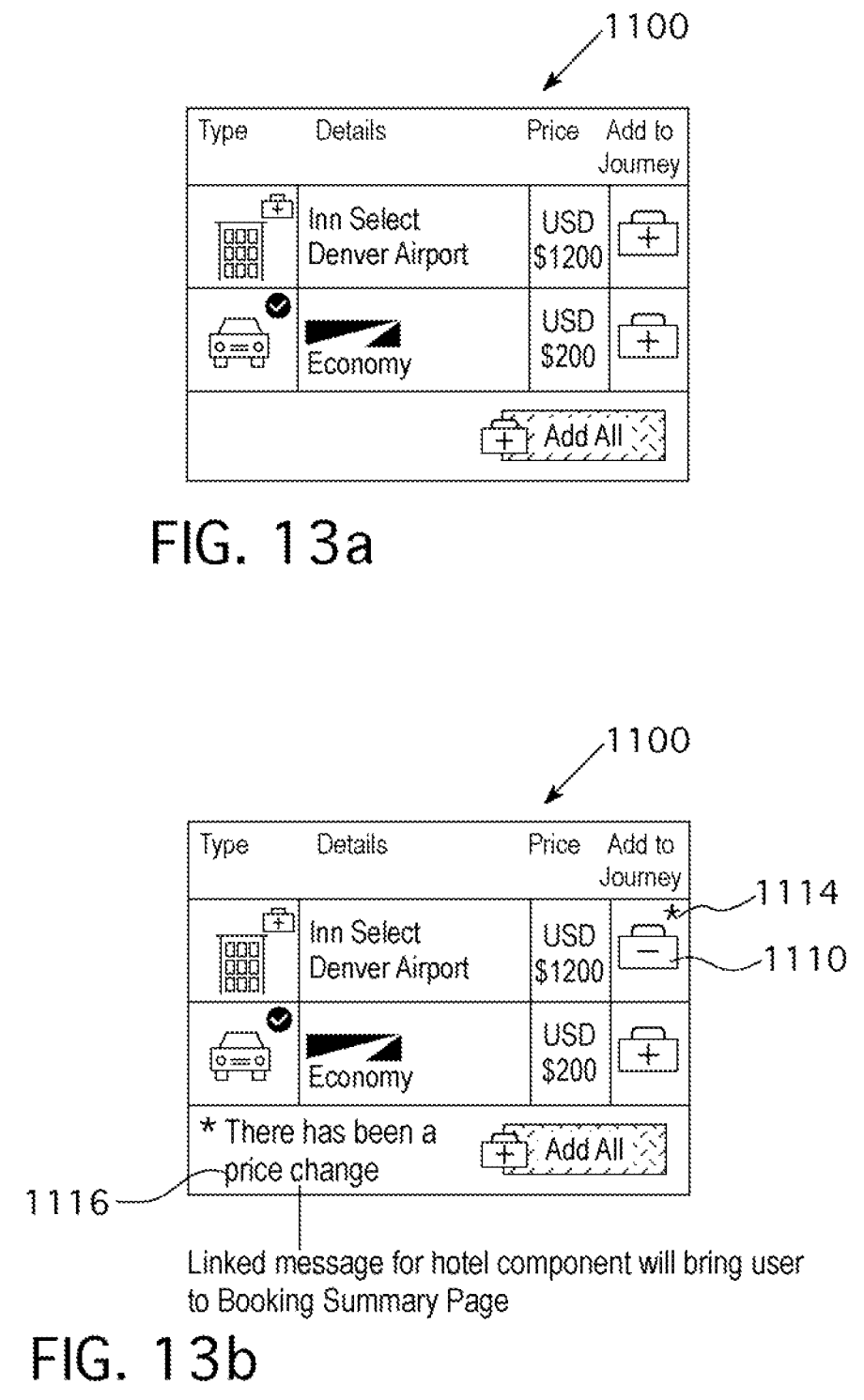

The itinerary component window 1100 could also be used to indicate changes in components, such as prices. Typically, this would only occur for unbooked components. Changes to travel options may be reported to the CRS 24 from the travel providers or the CRS 24 may query travel providers for updates. In the case of fares, for example, fare changes may be compared to the itinerary components stored in the journey database 28 to detect unbooked components where the price has changed. When such price changes are detected, the price changes can be reported to the users via the interface. FIGS. 13*a* and 13*b* show an example itinerary component window 1110 before and after a price change for the hotel selection. The fact that a price change has occurred is indicated, in this example, by the fact that the add component icon 1110 has a minus sign through it, indicating the component cannot be added by the user, and the asterisk 1114, which shows that there has been a price change. If the user clicks on or otherwise activates the link for the price change message 116, a booking summary page may be displayed showing the price change.

Figure 15:
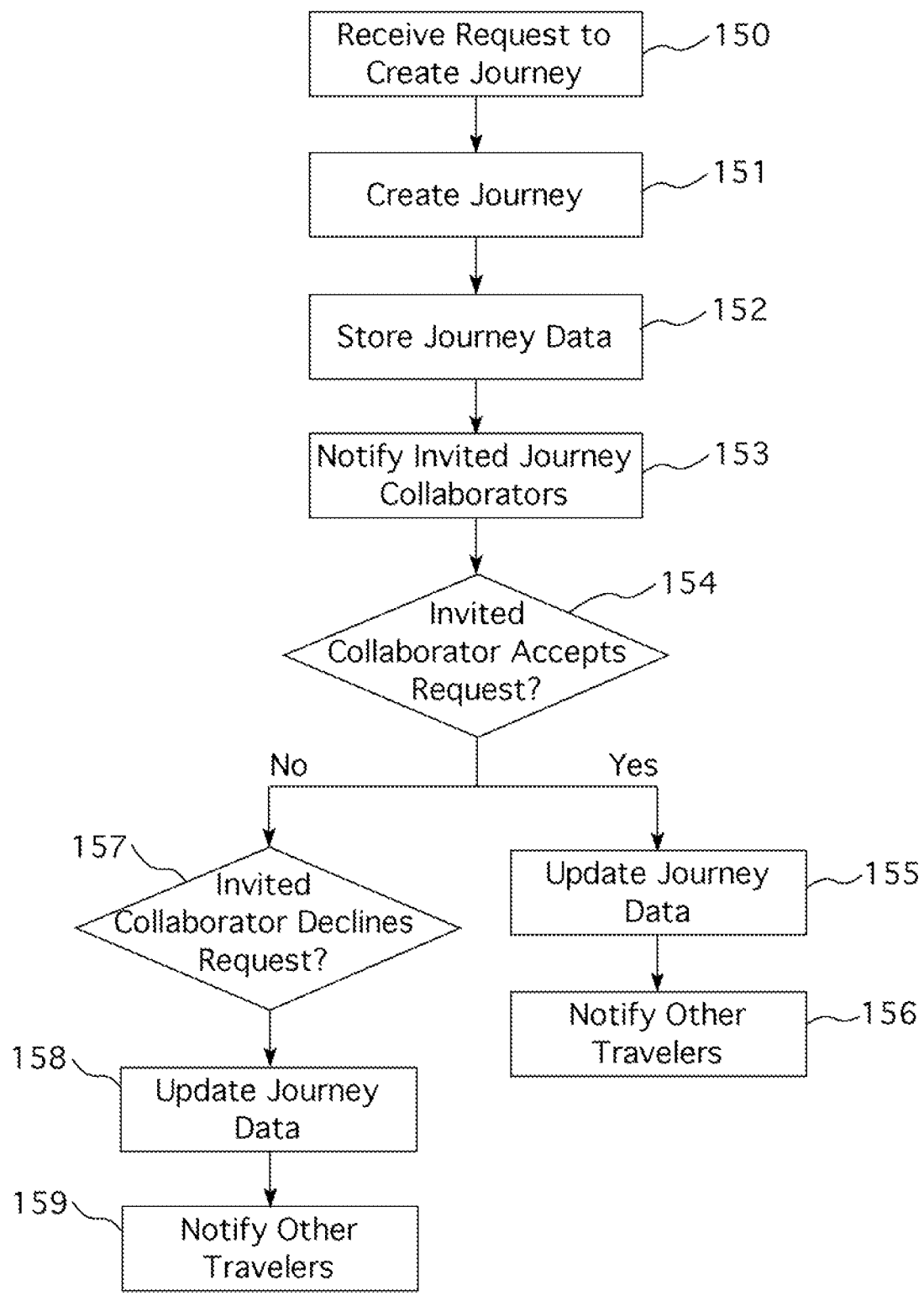
FIGS. 15 and 16 are diagrams of flow charts of processes of various embodiments of the present invention.
Figure 16:
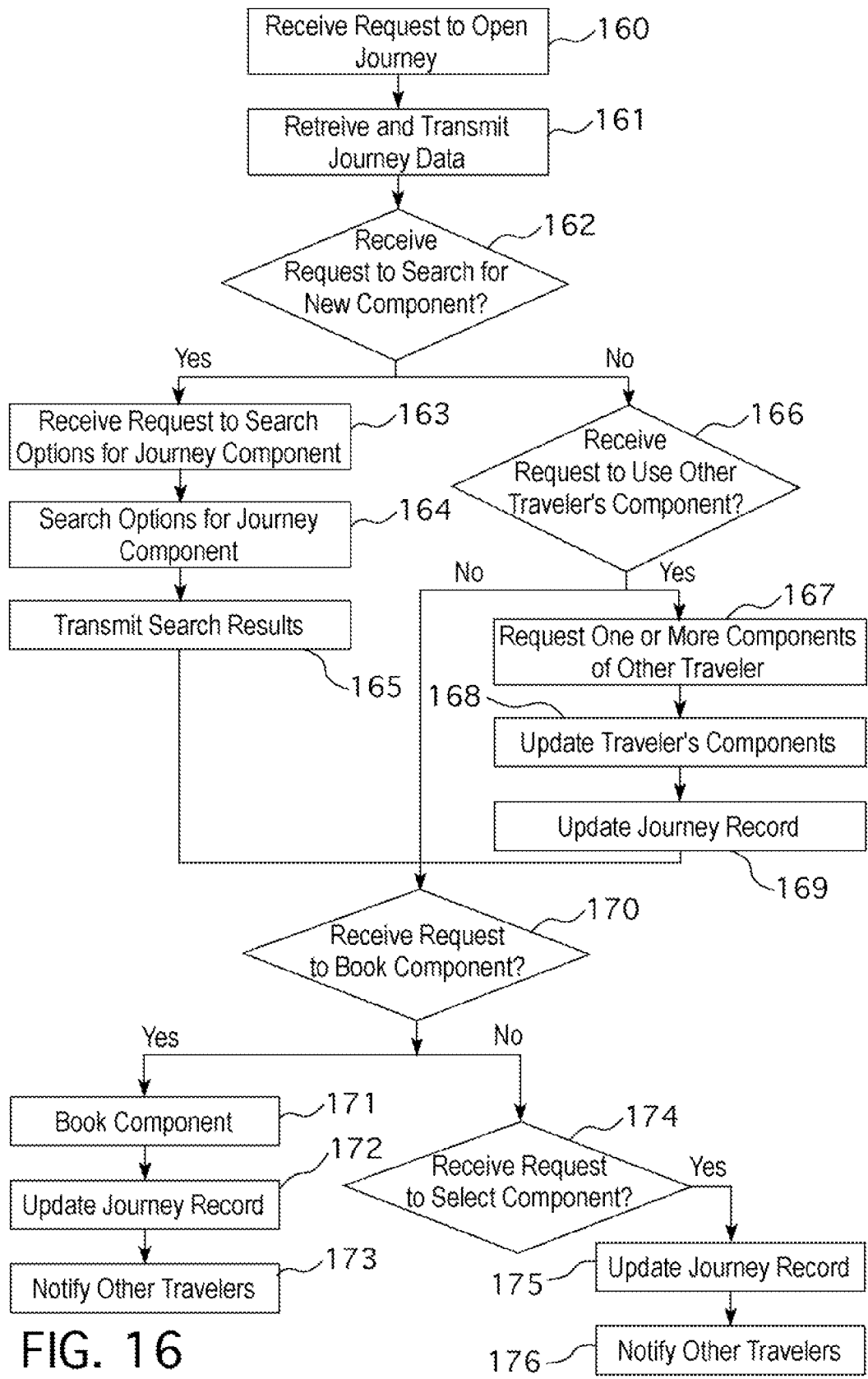

FIGS. 15 and 16 are diagrams of process flows that may be conducted or performed by the operations center 12 according to various embodiments of the present invention. At step 150, the operations center 12 (e.g., the web server 18 or the application server 22) receives a request to create a journey over the network 16 from an end-user 14 ("the journey creator"). At step 151, the operations center 12 creates a journey record in the journey database 28 for the journey created by the journey creator. At step 152, the operations center 12 stores information entered by the journey creator as journey data in journey database 28. The journey data may comprise information regarding journey details such as the itinerary (e.g., destination, dates, and times) and other invited travelers for the journey.

At step 153, the notification server 20 may transmit communications to the other invited travelers with requests to join the collaboration request. The notifications may be email or text messages, for example, and may include a URL or hyperlink where the recipient of the communications can access details regarding the journey. If at step 154 an invited traveler accepts the collaboration request, the journey record in the journey database 28 may be updated to indicate the status of the invited traveler at step 155. In addition, the other invited travelers (including the journey creator) may be notified of the accepted collaboration request at step 156 by the notification server 20.

If an invited traveler declines the collaboration request at step 157, in a similar manner the journey record in the journey database 28 may be updated to indicate the status of the invited traveler at step 158 and the other invited travelers (including the journey creator) may be notified of the declined collaboration request at step 159 by the notification server 20. Steps 154 to 159 may be repeated for each invited traveler. In addition, as mentioned above, an invited traveler could invite another traveler and/or appoint another person to act as a delegate for an invited traveler.

The process of FIG. 16 illustrates an example of how the operations center 12 may facilitate the arrangement of travel or itinerary components for an invited traveler for the journey. At step 160, the operations center 12 (e.g., the web server 18 or the application server 22) receives a request to open a previously created journey from an end-user 14 (e.g., an invited traveler). The request may be received via the website for the journey hosted by the web server 18 or may be received by the application server 22 for an end-user 14 who does not use web browser software to communicate with the operations center 12. At step 161, the web server 18 (or the application server 22) may retrieve the data for the journey from the journey database 28 and transmit the relevant data to the end-user 14 via the network 16.

At step 162, the operations center 12 may determine if it receives a request to search for a new itinerary component (e.g., travel, lodging, etc.) of the end-user's journey. This determination may be made based on the end-user's response to a prompt from the website asking if the end-user wishes to search for a new component. If the end-user is interested in searching for a new component, the process may advance to block 163, where the operations center 12 receives the request to search options for a component of the end-user's journey. At step 164, the CRS 24 may search for travel options that satisfy the search criteria (e.g., travel dates, originating and destination locations, fares, user preferred service providers, etc.). The search criteria may be based, for example, on journey data stored in the journey database 28 (e.g., destination, arrival date, etc.), data stored in the user profile database 26 (e.g., user preferred service providers), and/or data supplied by the end-user via the web interface (e.g., preferred travel times, etc.). At step 165, the operations center 12 (e.g., the web server 18 or the application server 22) may transmit the results of the search to the end-user 14 via the network 16, thereby providing the end-user 14 with one or more options that the end-user can select or book for their itinerary. At block 170, the end-user may then transmit a request to book one of the transmitted search options.

Returning to step 162, if the end-user does not request to search for options for an itinerary component, the operations center 12 may determine, at step 166, if it receives a request from the end-user to use an itinerary component of a another journey traveler (e.g., another traveler participating in the collaborative travel planning). This determination may be made based on the end-user's response to a prompt from the website asking if the end-user wishes to use an itinerary component of another journey traveler. If the end-user chooses to use an itinerary component of another traveler, the end-user requests one or more of the components of the other traveler at step 167. For example, as described above in connection with the example of FIG. 10, the end-user may view the itinerary components of another traveler by clicking on the suitcase icon next to the other traveler. The end-user could then select for him/herself all of the other itinerary components of the other traveler, or just one component at a time. When the end-user selects one or more itinerary components of the other traveler for him/herself, the end-user's itinerary components may be updated at step 168 and the journey recorded may be updated at step 169 with the end-user's newly selected itinerary components.

At step 170, the operations center 12 may determine whether the end-user has requested that his/her selected itinerary components should be booked. This step may be performed whether the end-user searched for travel options (from block 165), whether requested an itinerary component of another traveler (from block 169), or whether the end-user chose not to search for a new component or use another traveler's components (such as if the end-user already has selections in their suitcase). If at block 170 the end-user decides to book the component, the process may advance to block 171, where the operations center 12 (e.g., the CRS 24) books the component. In addition, at block 172 the journey recorded may be updated to indicate that the end-user has booked a component, and at block 173 notifications may be sent to the co-travelers about the end-user's booking, as described above.

If at block 170 the end-user does not request to book a component, the end-user may be prompted to tentatively select the component at step 174. If the end-user decided to tentatively select the component, at step 175 the journey recorded may be updated to indicate that the end-user has tentatively selected the component, and at block 176 notifications may be sent to the co-travelers about the end-user's tentative selection, as described above.

Figure 14:
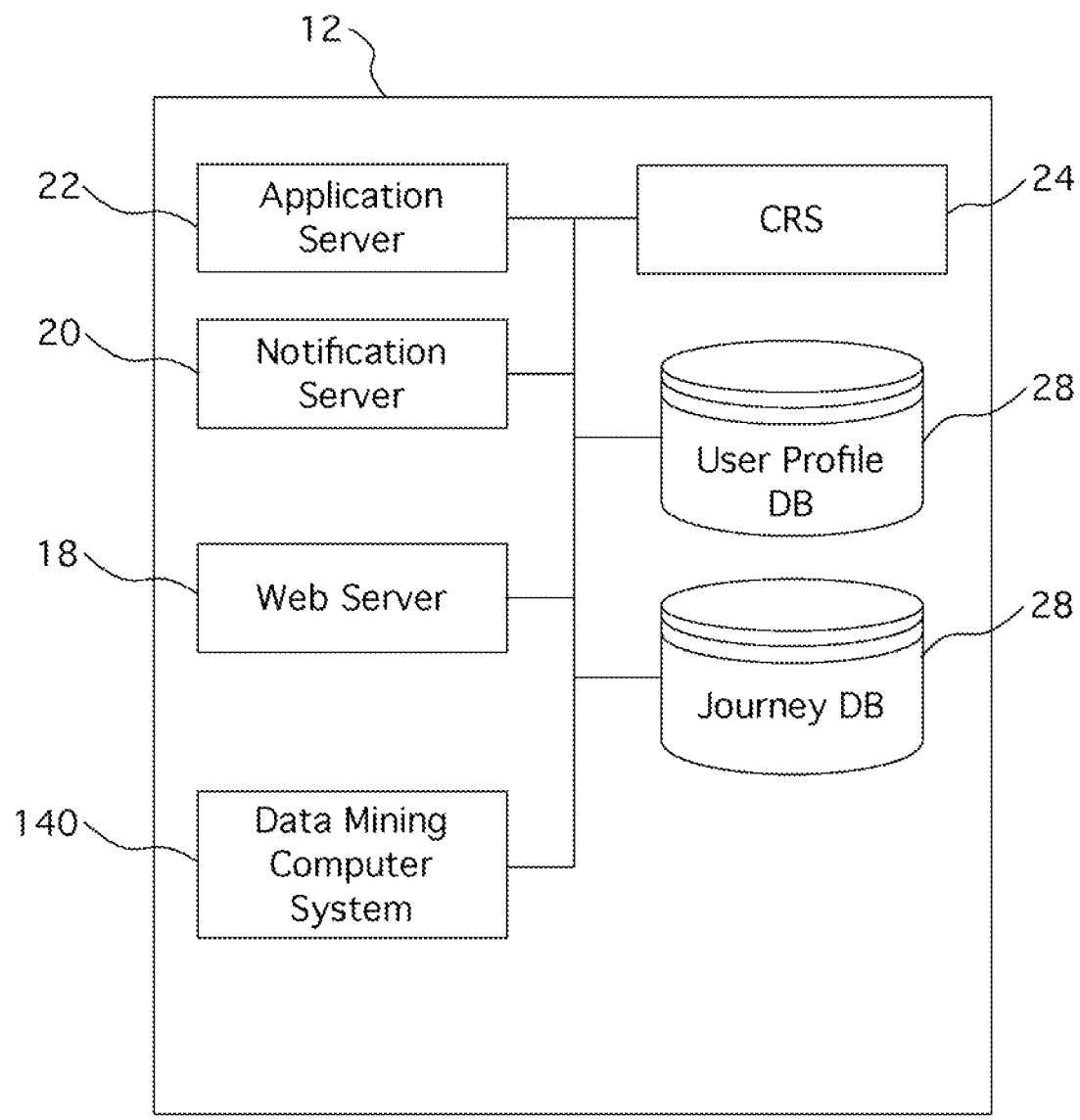
FIG. 14 is a diagram of a computer system according to various embodiments of the present invention.

In another embodiment, as shown in FIG. 14, the operations center 12 may comprise a data mining computer system 140 that mines the journey data in the journey database 28. The data mining computer system 140 may mine the data stored in the journey database 28 to, for example, (i) determine important factors in selecting components or (ii) obtain marketing feedback from the users, especially based on the messages posted by the collaborators.

In the embodiments described above, the operations center 12 comprised a CRS 24 for searching for and booking journey itinerary components. In other embodiments, the operations center 12 may comprise another type of travel component booking computer system. Such other travel component booking computer systems may be in lieu of or in addition to a CRS. For example, instead of or in addition to a CRS, the operations center 12 may comprise a computer system that communicates directly with the computer systems of travel service providers (e.g., airlines, train lines, bus lines, hotels, rental car agencies, etc.) to select and/or book travel options.

In various embodiments, the present invention is directed a computer system for facilitating interdependent travel planning. The computer system may comprise one or more servers (e.g., the web server 18, the notification server 20, and the application server 22) that are programmed to: (i) receive journey data from a client communication device associated with a first traveler; (ii) store the journey data; (iii) retrieve travel provider data (e.g., from the CRS 24); (iv) identify travel options for the first traveler based on the journey data and the travel provider data; (v) store the travel options for the first traveler as part of the journey data; and (vi) transmit to a client communication device, associated with a second traveler, travel options for the second traveler that are based on, in part, the travel options of the first traveler. The one or more servers may be further programmed to store the travel options for the second traveler as part of the journey data. The one or more servers may be further programmed to host a portal (e.g., a website or network-enabled user-interface, such as interface 1000) accessible by the first and second travelers, where the portal comprises and displays information about the journey data. The one or more servers may be further programmed to (i) receive an indication of one or more selections of travel options for the first or second traveler, when the one or more selections are based on the travel options for the other traveler; and (ii) display the one or more selections on the portal. The one or more selections may be based on the unhooked travel options for the other traveler. The one or more servers may be further programmed to: (i) receive an indication to book the one or more selections; and (ii) transmit a request to book the one or more selections to a service provider associated with the received indication.

In another embodiment, the present invention is directed to a processing means for: (i) receiving journey data; (ii) storing journey data; (iii) retrieving travel provider data; (iv) identifying travel options for a first traveler based on the journey data and the travel provider data; (v) storing the travel options for the first traveler as part of the journey data; and (vi) transmitting travel options for a second traveler based on, in part, the travel options for a first traveler.

In another embodiment, the present invention is directed to a computer system for facilitating interdependent travel planning. The computer system may comprise: (i) a first database that stores travel data, the travel data comprising carrier schedules for one or more types of travel; (ii) a second database for storing journey data; and (iii) a server system (e.g., operations center 12) in communication with the first and second databases. The server system may comprise one or more servers that are programmed to: (i) receive from a first client communication device, associated with a first traveler, via a communication network, journey data to request creation of a journey, where the journey data comprises data regarding: a destination for the journey; a time for the journey; an identification for a second traveler for the journey; (ii) store the journey data in the second database; (iii) transmit notification of the journey to the second traveler via the communication network; (iv) identify travel options for the first traveler based on the journey data and data stored in the first database; (v) store the travel options for the first traveler in the second database; and (vi) transmit travel option data to the second traveler via the communication network, where the travel option data represents unbooked travel options for the second traveler that are based on, in part, the travel options of the first travel stored in the second database. The one or more servers may be further programmed to host a user interface or portal accessible by the first and second travelers, wherein the portal comprises information about the journey. The one or more servers may be further programmed to: (i) receive via the communication network an indication of one or more unbooked selections for one or more elements of the journey the second traveler based on the travel options transmitted to the second traveler; and (ii) display the one or more unbooked selections for the one or more elements of the journey for the second traveler on the web portal so that the one or more unhooked selections are viewable on the portal by the first traveler.

In another embodiment, the present invention is directed to a computer system comprising: (i) a first database that stores travel data, the travel data comprising carrier schedules for one or more types of travel; (ii) a second database; and (iii) a server system in communication with the first and second databases. The server system comprises one or more servers that are programmed to: (i) receive from a first client communication device, associated with a first traveler, via a communication network, journey data to request creation of a journey, wherein the journey data comprises data regarding: a destination for the journey; a time for the journey; and an identification for one or more additional travelers for the journey; (ii) store the journey data in the second database; (iii) transmit notification of the journey to one or more additional travelers via the communication network; and (iv) host a portal accessible by the first traveler and the one or more additional travelers that displays information comprising: whether the one or more additional travelers have accepted or declined the journey; whether the one or more additional travelers has booked an element for the journey; and whether the one or more additional travelers is on-line for an interactive discussion hosted by the portal.

In another embodiment, the present invention is directed to a method for facilitating interdependent travel planning. The method may comprise: (i) receiving, at a server center comprising one or more servers, from a first client communication device, associated with a first traveler, via a communication network, journey data to request creation of a journey, where the journey data comprises data regarding: a destination for the journey; a time for the journey; and an identification for a second traveler for the journey; (ii) storing the journey data in a first database; (iii) transmitting notification of the journey to the second traveler from the server center via the communication network; (iv) identifying, by the server center, travel options for the first traveler based on the journey data and data stored in a second database, wherein the second database comprises travel data, the travel data comprising carrier schedules for one or more types of travel; (v) storing the travel options for the first traveler in the first database; and (vi) transmitting, from the server center, travel option data to the second traveler via the communication network, wherein the travel option data represents unbooked travel options for the second traveler that are based on, in part, the travel options of the first travel stored in the second database. The method may further comprise hosting a portal accessible by the first and second travelers, wherein the portal comprises information about the journey.

The method may further comprise: (i) receiving via the communication network an indication of one or more unbooked selections for one or more elements of the journey the second traveler based on the travel options transmitted to the second traveler; and (ii) displaying the one or more unbooked selections for the one or more elements of the journey for the second traveler on the portal so that the one or more unbooked selections are viewable on the web portal by the first traveler. The method may further comprise: (i) receiving via the communication network an indication of one or more unbooked selections for one or more elements of the journey from the first traveler based on the travel options transmitted to the first traveler; and (ii) displaying the one or more unbooked selections for the one or more elements of the journey for the first traveler on the portal so that the one or more initial selections are viewable on the web portal by the second traveler.

In another embodiments, the present invention is directed to a computer-implemented collaborative travel planning method that comprises the step of receiving electronically, via a data network, by a computer system, a collaborative journey request from a first traveler. The collaborative journey request includes journey data for a journey involving the first traveler and at least one second traveler. The journey data comprises a date for the journey, a location associated with the journey, and an identifier for the at least one second traveler. The computer system comprises at least one server for hosting a user interface related to the journey that is accessible by the first traveler and the at least one second traveler via the data network, a travel component booking computer system (e.g., a CRS) in communication with the at least one server; and at least one computer database that stores data, the data comprising the journey data. The method further comprises the step of sending, by the computer system, via the data network, a notification to the at least one second traveler regarding the first traveler's collaborative journey request, wherein the notification includes data for accessing the user interface hosted by the computer system. The method also comprises receiving electronically, via the data network, by the computer system, from the at least one second traveler, a response to the notification, wherein the response comprises either an acceptance to the collaborative journey request or a rejection of the collaborative journey request. The method further comprises receiving electronically, via the data network, by the computer system, a journey itinerary selection for the journey from either the first traveler or the at least one second traveler. The journey itinerary selection comprises a tentative selection or a booking request for an itinerary component for the journey, where one or more options for the journey itinerary selection are determined by the travel component booking computer system and provided to the first traveler or the at least one second traveler via the user interface. The method further comprises displaying, by the computer system on the user interface, journey information for the journey. The journey information comprises information such as journey itinerary data for the first traveler and the at least one second traveler, including tentatively selected or booked itinerary components, and an indication of whether the at least one second traveler has accepted or rejected the collaborative journey request.

According to various implementations, the itinerary component comprises, for example, a transportation component, a lodging component, or a rental vehicle component. The notification sent to the at least one second traveler regarding the first traveler's collaborative journey request may comprises a URL for a web site for the user interface. The method may further comprise the step of receiving, via the data network, by the computer system, a message from either the first traveler or the at least one second traveler, where the message is posted on the user interface hosted by the computer system. The message preferably is viewable on the user interface by the first traveler and the at least one second traveler. The method may further comprise sending a notification, via the data network, from the computer system, to the at least one second traveler when the first traveler makes, cancels, or changes a journey itinerary selection. In addition, the user interface may provide the at least one second traveler with an option to select the itinerary component of the first traveler.

In another embodiment, the present invention is directed to a computer system for facilitating interdependent travel planning among a plurality of travelers. The computer system comprises: at least one server; a travel component booking computer system (e.g., a CRS) in communication with the at least one server; and at least one computer database that stores data, wherein the at least one computer database is in communication with the at least one server and the travel component booking computer system. The at least one server is programmed to: (i) receive via a data network a collaborative journey request from a first traveler, the collaborative journey request including journey data for a journey involving the first traveler and at least one second traveler, wherein the journey data comprises a date for the journey, a location associated with the journey, and an identifier for the at least one second traveler; (ii) send via the data network a notification to the at least one second traveler regarding the first traveler's collaborative journey request, wherein the notification includes data for accessing a user interface hosted by a computer system, wherein the user interface is related to the journey and is accessible by the first traveler and the at least one second traveler via the data network; (iii) receive via the data network from the at least one second traveler, a response to the notification, wherein the response comprises either an acceptance to the collaborative journey request or a rejection of the collaborative journey request; (iv) receive via the data network a journey itinerary selection for the journey from either the first traveler or the at least one second traveler, wherein the journey itinerary selection comprises a tentative selection or a booking request for an itinerary component for the journey, wherein one or more options for the journey itinerary selection are determined by the travel component booking computer system and provided to the first traveler or the at least one second traveler via the user interface; and (v) display on the user interface journey information for the journey. The displayed journey information may comprise: journey itinerary data for the first traveler and the at least one second traveler; and an indication of whether the at least one second traveler has accepted or rejected the collaborative journey request In another embodiment, the at least one server is programmed to: (i) receive journey data for a journey from a first traveler, wherein the journey data comprises a date for the journey, a location associated with the journey, and an identifier for a second traveler for the journey, wherein the received journey data is stored in the at least one computer database; (ii) receive a journey itinerary selection from the first traveler, wherein the journey itinerary selection comprises a tentative selection or a booking request for an itinerary component for the journey, wherein one or more options for the itinerary component are determined by the travel component booking computer system based on the journey data, and wherein data for the received journey itinerary selection are stored in the at least one computer database; and (iii) transmit journey itinerary option data to the second traveler for an itinerary component of the journey for the second traveler, wherein the journey itinerary option data is determined by the travel component booking computer system based on the journey data.

In another embodiment, the computer-based system for facilitating interdependent travel planning comprises: a first database that stores journey data; and a computer system comprising one or more servers in communication with the first database. The one or more servers that are programmed to: (i) receive from a first traveler, via a communication network, a collaborative journey request including journey data for a journey involving the first traveler, where the journey data comprises data regarding a destination for the journey, a time for the journey, and an identification for a second traveler for the journey; (ii) store the journey data in the first database; (iii) transmit notification of the collaborative journey request to the second traveler via the communication network; (iv) identify travel options for the first traveler for the journey based on the journey data stored in the first database and carrier travel data, wherein the carrier travel data comprises carrier schedules for one or more types of carrier travel; (v) store the travel options for the first traveler in the first database; and (vi) transmit travel option data to the second traveler via the communication network, where the travel option data represents travel options for the second traveler that are based on, in part, the travel options of the first travel stored in the first database.

In another embodiment, the one or more servers that are programmed to: (i) receive from a first traveler, via a communication network, a collaborative journey request including journey data for a journey involving the first traveler, where the journey data comprises data regarding a destination for the journey, a time for the journey, and an identification for one or more additional travelers for the journey; (ii) store the journey data in the first database; transmit notification of the collaborative journey request to the one or more additional travelers via the communication network; and (iii) host a portal accessible by the first traveler and the one or more additional travelers that displays information. The displayed information may comprise: whether the one or more additional travelers have accepted or declined the collaborative journey request; whether the one or more additional travelers has made a journey itinerary selection for the journey; and whether the one or more additional travelers is on-line for an interactive discussion hosted by the portal.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement, embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented collaborative travel planning method comprising:

receiving electronically, via a data network, by a computer system, a collaborative journey request from a first traveler, the collaborative journey request including journey data for a journey involving the first traveler and at least one second traveler, wherein the journey data comprises a date for the journey, a location associated with the journey, and an identifier for the at least one second traveler, wherein the computer system comprises:

at least one server providing a user interface accessible by the first traveler and the at least one second traveler via the data network for real-time collaborative travel planning between the first traveler and the at least one second traveler, wherein the user interface comprises:

a first portion that displays user-selectable control elements for the first traveler and the at least one second traveler to at least one of search for, tentatively select, or book itinerary components related to the journey; and a second portion that displays a messaging interface for the first traveler and the at least one second traveler to exchange messages related to the journey in real-time;
a computerized reservation system (CRS) in communication with the at least one server, wherein the CRS is programmed to:
retrieve travel service provider data for the first traveler and the at least one second traveler to at least one of search for or tentatively select the itinerary components via the user-selectable control elements of the user interface; and
book itinerary components, requested via the user-selectable control elements of the user interface, with travel service providers; and
at least one computer database that stores data, the data comprising the journey data;
sending, by the computer system, via the data network, a notification to the at least one second traveler regarding the first traveler's collaborative journey request, wherein the notification includes a hyperlink for accessing the user interface;
receiving electronically, via the data network, by the computer system, from the at least one second traveler, a response to the notification, wherein the response comprises either an acceptance of the collaborative journey request or a rejection of the collaborative journey request;
generating, by the at least one server, an itinerary component interface based on at least one journey itinerary selection received electronically from either the first traveler or the at least one second traveler, via the data network, by the computer system, wherein each journey itinerary selection comprises a tentative selection or a booking request for an itinerary component for the journey, and wherein the itinerary component interface comprises a user-selectable control element selectable by either: i) the first traveler to add an itinerary component associated with a journey itinerary selection received by the computer system from the at least one second traveler to a journey itinerary of the first traveler, or ii) the at least one second traveler to add an itinerary component associated with a journey itinerary selection received by the computer system from of the first traveler to a journey itinerary of the at least one second traveler; and
displaying, by the computer system on the user interface, journey information for the journey, wherein the journey information comprises the journey itinerary of the first traveler and the at least one second traveler, wherein each journey itinerary comprises at least one of a tentatively selected itinerary component or a booked itinerary component for the journey.

2. The method of claim 1, wherein the itinerary component for the journey of each journey itinerary selection comprises a transportation component, a lodging component, or a rental vehicle component.

3. The method of claim 1, wherein the hyperlink comprises a URL for a web site for the user interface.

4. The method of claim 1, further comprising receiving, via the data network, by the computer system, a message from either the first traveler or the at least one second traveler, wherein the message is posted on the messaging interface.

5. The method of claim 4, wherein the message is viewable on the messaging interface by the first traveler and the at least one second traveler.

6. The method of claim 1, further comprising sending a notification, via the data network, from the computer system, to the at least one second traveler when the first traveler makes the journey itinerary selection that is received by the computer system.

7. The method of claim 6, wherein the itinerary component interface comprises a user-selectable control element selectable by the at least one second traveler to add the itinerary component associated with the journey itinerary selection just made by the first traveler to the journey itinerary of the at least one second traveler.

8. The method of claim 1, further comprising sending a notification, via the data network, from the computer system, to the first traveler when the at least one second traveler makes the journey itinerary selection that is received by the computer system.

9. The method of claim 8, further comprising sending a notification, via the data network, from the computer system, to the first traveler when the at least one second traveler changes a previously made journey itinerary selection of the at least one second traveler.

10. The method of claim 8, further comprising sending a notification, via the data network, from the computer system, to the first traveler when the at least one second traveler cancels a previously made journey itinerary selection of the at least one second traveler.

11. The method of claim 8, wherein the itinerary component interface comprises a user-selectable control element selectable by the first traveler to add the itinerary component associated with the journey itinerary selection just made by the at least one second traveler to the journey itinerary of the first traveler.

12. The method of claim 1, further comprising sending a notification, via the data network, from the computer system, to the first traveler when the at least one second traveler makes a response to the notification sent to the at least one second traveler regarding the collaborative journey request.

13. The method of claim 1, further comprising:
receiving electronically, via the data network, by the computer system, a selection of the user-selectable control element by either the first traveler or the at least one second traveler; and
booking, by the CRS, either the itinerary component associated with the journey itinerary selection of the at least one second traveler for the first traveler in response to the selection of the user-selectable control element by the first traveler, or the itinerary component associated with the journey itinerary selection of the first traveler for the at least one second traveler in response to the selection of the user-selectable control element by the at least one second traveler.

14. A computer system for facilitating interdependent travel planning among a plurality of travelers, the computer system comprising:
at least one server;
at least one computer database that stores data, wherein the at least one computer database is in communication with the at least one server;
wherein the at least one server is programmed to:
receive, via a data network, a collaborative journey request from a first traveler, the collaborative journey request including journey data for a journey involving the first traveler and at least one second traveler, wherein the journey data comprises a date for the journey, a location associated with the journey, and an identifier for the at least one second traveler;

provide, via the data network, a user interface accessible by the first traveler and the at least one second traveler for real-time collaborative travel planning between the first traveler and the at least one second traveler, wherein the user interface comprises:
   a first portion that displays user-selectable control elements for the first traveler and the at least one second traveler to at least one of search for, tentatively select, or book itinerary components related to the journey; and
   a second portion that displays a messaging interface for real time interactive messaging between the first traveler and the at least one second traveler related to the journey;
send, via the data network, a notification to the at least one second traveler regarding the first traveler's collaborative journey request, wherein the notification includes a hyperlink for accessing the user interface;
receive, via the data network, from the at least one second traveler, a response to the notification, wherein the response comprises either an acceptance of the collaborative journey request or a rejection of the collaborative journey request;
generate an itinerary component interface based on at least one journey itinerary selection received from either the first traveler or the at least one second traveler, via the data network, wherein each journey itinerary selection comprises a tentative selection or a booking request for an itinerary component for the journey, and wherein the itinerary component interface comprises a user-selectable control element selectable by either: i) the first traveler to add an itinerary component associated with a journey itinerary selection received by the at least one server from of the at least one second traveler to a journey itinerary of the first traveler, or ii) the at least one second traveler to add an itinerary component associated with a journey itinerary selection received by the at least one server from of the first traveler to a journey itinerary of the at least one second traveler; and
display, on the user interface, journey information for the journey, wherein the journey information comprises the journey itinerary of the first traveler and the at least one second traveler, wherein each journey itinerary comprises at least one of a tentatively selected itinerary component or a booked itinerary component for the journey; and
a computerized reservation system (CRS) in communication with the at least one server and the at least one computer database, wherein the CRS is programmed to:
   retrieve travel service provider data for the first traveler and the at least one second traveler to at least one of search for or tentatively select the itinerary components via the user-selectable control elements of the user interface; and
   book the itinerary components, requested via the user-selectable control elements of the user interface, with travel service providers.

15. The computer system of claim 14, wherein:
the at least one server is further programmed to receive electronically, via the data network, a selection of the user-selectable control element by either the first traveler or the at least one second traveler; and
the CRS is programmed to book either the itinerary component associated with the journey itinerary selection of the at least one second traveler for the first traveler in response to the selection of the user-selectable control element by the first traveler, or the itinerary component associated with the journey itinerary selection of the first traveler for the at least one second traveler in response to the selection of the user-selectable control element by the at least one second traveler.

16. The computer system of claim 14, wherein the at least one server is further programmed to generate the itinerary component interface comprising a second user-selectable control element selectable by either: i) the first traveler to add more than one itinerary component associated with more than one journey itinerary selection of the at least one second traveler to a journey itinerary of the first traveler upon a single selection of the second user-selectable control element, or ii) the at least one second traveler to add more than one itinerary component associated with more than one journey itinerary selection of the first traveler to a journey itinerary of the at least one second traveler upon a single selection of the second user-selectable control element.

17. The computer system of claim 16, wherein:
the at least one server is further programmed to receive electronically, via the data network, a selection of the second user-selectable control element by either the first traveler or the at least one second traveler; and
the CRS is programmed to book either the more than one itinerary component associated with the more than one journey itinerary selection of the at least one second traveler for the first traveler in response to the selection of the second user-selectable control element by the first traveler, or the more than one itinerary component associated with the more than one journey itinerary selection of the first traveler for the at least one second traveler in response to the selection of the second user-selectable control element by the at least one second traveler.

18. A computer system for facilitating interdependent travel planning among a plurality of travelers, the computer system comprising:
at least one server;
a computerized reservation system (CRS) in communication with the at least one server; and
at least one computer database that stores data, wherein the at least one computer database is in communication with the at least one server and the CRS;
wherein the at least one server is programmed to:
   receive journey data for a journey from a first traveler, wherein the journey data comprises a date for the journey, a location associated with the journey, and an identifier for a second traveler for the journey, wherein the received journey data is stored in the at least one computer database;
   provide a user interface accessible by the first traveler and the second traveler, wherein the user interface comprises:
     a first portion that displays an itinerary component interface based on at least one journey itinerary selection received from the first traveler, wherein each journey itinerary selection comprises a tentative selection or a booking request for an itinerary component for the journey, and wherein the itinerary component interface comprises a user-selectable control element selectable by the second traveler to add at least one itinerary component associated with the at least one journey itinerary selection of the first traveler to a journey itinerary of the second traveler; and a second portion that that displays a messaging interface for the first traveler and the second traveler to exchange messages related to the journey in real-time; and transmit itinerary component options to the second traveler, wherein the itinerary component options comprise:

one or more than one itinerary component option determined by the CRS based on the journey data; and the at least one itinerary component selectable via the user-selectable control element of the itinerary component interface; and wherein the CRS is programmed to:

search for the determined one or more than one itinerary component option based on the journey data;

book at least one of: i) the determined one or more than one itinerary component option or (ii) the at least one itinerary component, requested via the user-selectable control element, with a travel service provider.

19. The computer system of claim 18, wherein:

the at least one server is further programmed to receive electronically, via the data network, a selection of the user-selectable control element by the second traveler; and the CRS is programmed to book the at least one itinerary component associated with the at least one journey itinerary selection of the first traveler for the second traveler in response to the selection of the user-selectable control element by the second traveler.

20. A computer-based system for facilitating interdependent travel planning, the system comprising:

at least one computer database that stores data;

at least one server in communication with the at least one computer database, wherein the at least one server is programmed to:

provide a graphical user interface to end-users connected to the at least one server via a data network, wherein the user interface displays:

a first portion that displays a journey itinerary of a first end-user and one or more than one second end-user, wherein the journey itinerary of the first end-user comprises at least one journey itinerary selection of the first end-user; and a second portion that displays a messaging field for the first end-user and the one or more than one second end-user to exchange messages;

generate an itinerary component interface based on the at least one journey itinerary selection of the first end-user for each of the one or more than one second end-user, wherein each itinerary component interface comprises a user-selectable control element, selectable to add at least one itinerary component associated with the at least one journey itinerary selection received from the first end-user to the journey itinerary of a selecting second end-user; and receive, via the data network, a selection of the user-selectable control by at least one of the one or more than one second end-user; and a computerized reservation system (CRS) in communication with the at least one server and the at least one computer database, wherein the CRS is programmed to book the at least one itinerary component associated with the at least one journey itinerary selection of the first end-user for the at least one second end-user in response to the selection of the user-selectable control element by the at least one second end-user.

* * * * *